US007080361B2

(12) United States Patent
Aigen

(10) Patent No.: US 7,080,361 B2
(45) Date of Patent: Jul. 18, 2006

(54) PROCESS FOR GENERATING ENTERPRISE JAVA BEAN COMPONENTS FROM AN SQL DATABASE

(75) Inventor: Michael L. Aigen, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 724 days.

(21) Appl. No.: 09/916,516

(22) Filed: Jul. 30, 2001

(65) Prior Publication Data

US 2003/0055820 A1    Mar. 20, 2003

(51) Int. Cl.
*G06F 9/45*  (2006.01)
*G06F 9/44*  (2006.01)

(52) U.S. Cl. ........................ 717/137; 717/108
(58) Field of Classification Search ................ 717/136, 717/137; 707/10, 100, 102, 103 Y, 103 R
See application file for complete search history.

(56) References Cited

U.S. PATENT DOCUMENTS

| 5,701,461 | A |   | 12/1997 | Dalal et al. |
| 5,737,592 | A |   | 4/1998 | Nguyen et al. |
| 5,857,197 | A | * | 1/1999 | Mullins .................. 707/103 R |
| 5,878,418 | A |   | 3/1999 | Polcyn et al. |
| 5,899,990 | A |   | 5/1999 | Maritzen et al. |
| 5,970,490 | A |   | 10/1999 | Morgenstern |
| 5,999,944 | A |   | 12/1999 | Lipkin |
| 6,591,272 | B1 | * | 7/2003 | Williams ................... 707/102 |
| 6,609,133 | B1 | * | 8/2003 | Ng et al. ................ 707/103 Y |
| 6,633,889 | B1 | * | 10/2003 | Dessloch et al. ....... 707/103 Y |
| 6,643,652 | B1 | * | 11/2003 | Helgeson et al. ............. 707/10 |
| 2002/0016954 | A1 | * | 2/2002 | Charisius et al. ............. 717/2 |
| 2002/0091702 | A1 | * | 7/2002 | Mullins ...................... 707/100 |
| 2002/0095423 | A1 | * | 7/2002 | Dessloch et al. ........... 707/100 |
| 2002/0188616 | A1 | * | 12/2002 | Chinnici et al. ............ 707/102 |

OTHER PUBLICATIONS

R.K. Ege; "Storing Objects in Any Database"; Technology of Object-Oriented Languages and Systems; 1999. TOOLS 30 Proceedings; pp. 312-321.
M. Aleksy et al; "Interoperability and Interchangeability of Middleware Components in a Three-Tier CORBA-Environment-State of the Art"; Enterprose Distributed Object Computing Conference, 1999. EDOC '99. Proceedings. Third International; pp. 204-214.

(Continued)

*Primary Examiner*—Kakali Chaki
*Assistant Examiner*—Trenton J. Roche
(74) *Attorney, Agent, or Firm*—Whitman, Curtis, Christofferson & Cook, PC

(57) ABSTRACT

Converting SQL databases to Enterprise JAVA Beans, when using conventional methods, has become a tedious, error-prone, time-consuming task. The invention, called Bean-Grinder, automates the task so that a process hitherto taking days or weeks can be accomplished in matters of minutes. The user selects the databases to be converted, the tables for the resulting data, the target location, and the application server. Then, the user runs the BeanGrinder before running two batch command file programs to complete the task. The user is relieved of the need to write special conversion programs for every database to be converted.

13 Claims, 23 Drawing Sheets

OTHER PUBLICATIONS

A. Yang et al.; "Developing Integrated Web and Database Applications Using JAVA Applets and JDBC Drivers"; Proceedings of the 29th SIGCSE Technical Symposium on Computer Science Education, Feb. 26-Mar. 1, 2998; pp. 302-306.

S. Brown et al; "Object Design of a Distributed Client/Server System"; Ninth International Workshop on Database and Expert Systems Applications, 1998. Proceedings; pp. 956-977.

* cited by examiner (USER INTERFACE)

(DATA COLLECTION)

(REMOTE JAVA FILE GENERATION)

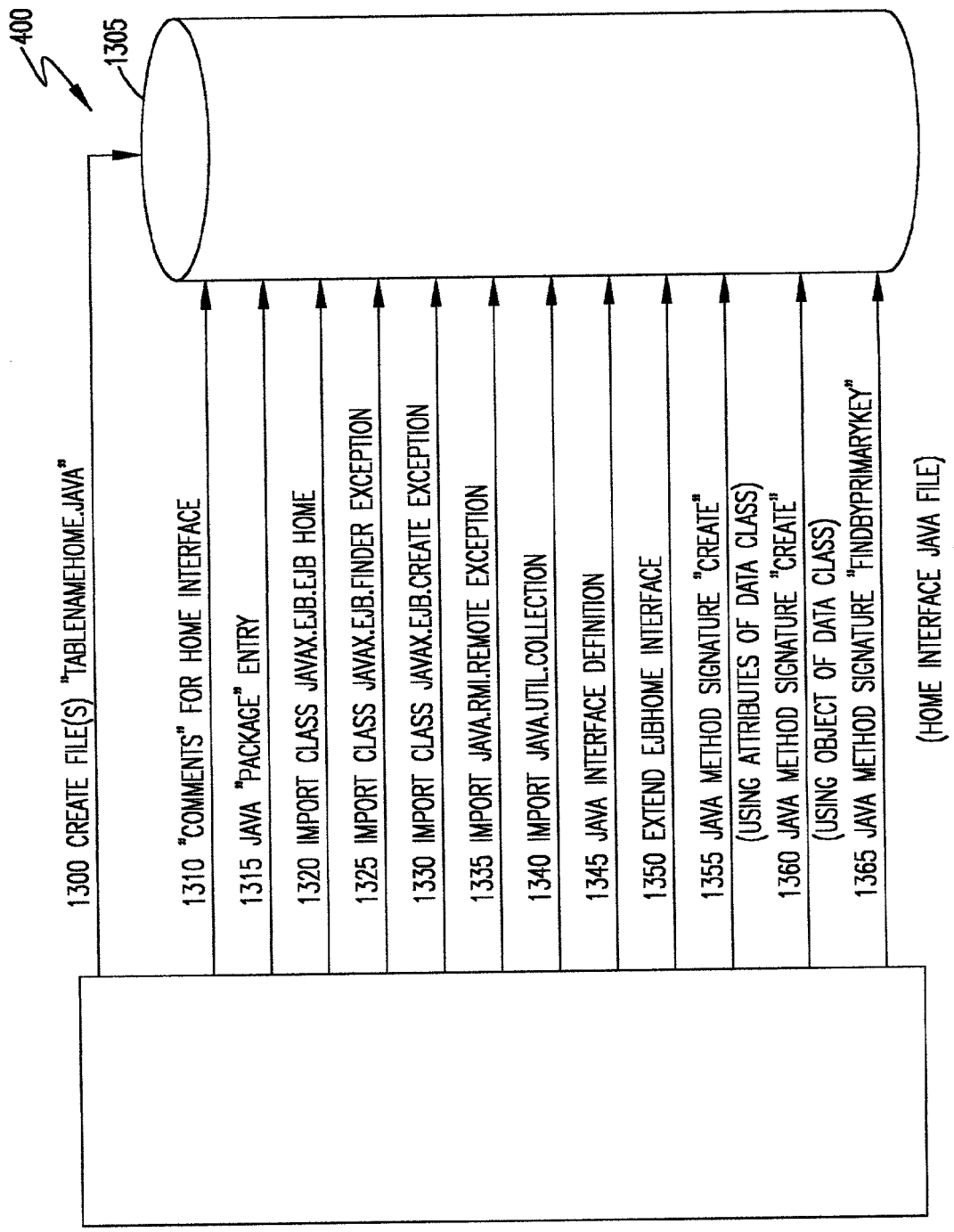
FIG. 4 (HOME INTERFACE JAVA FILE)

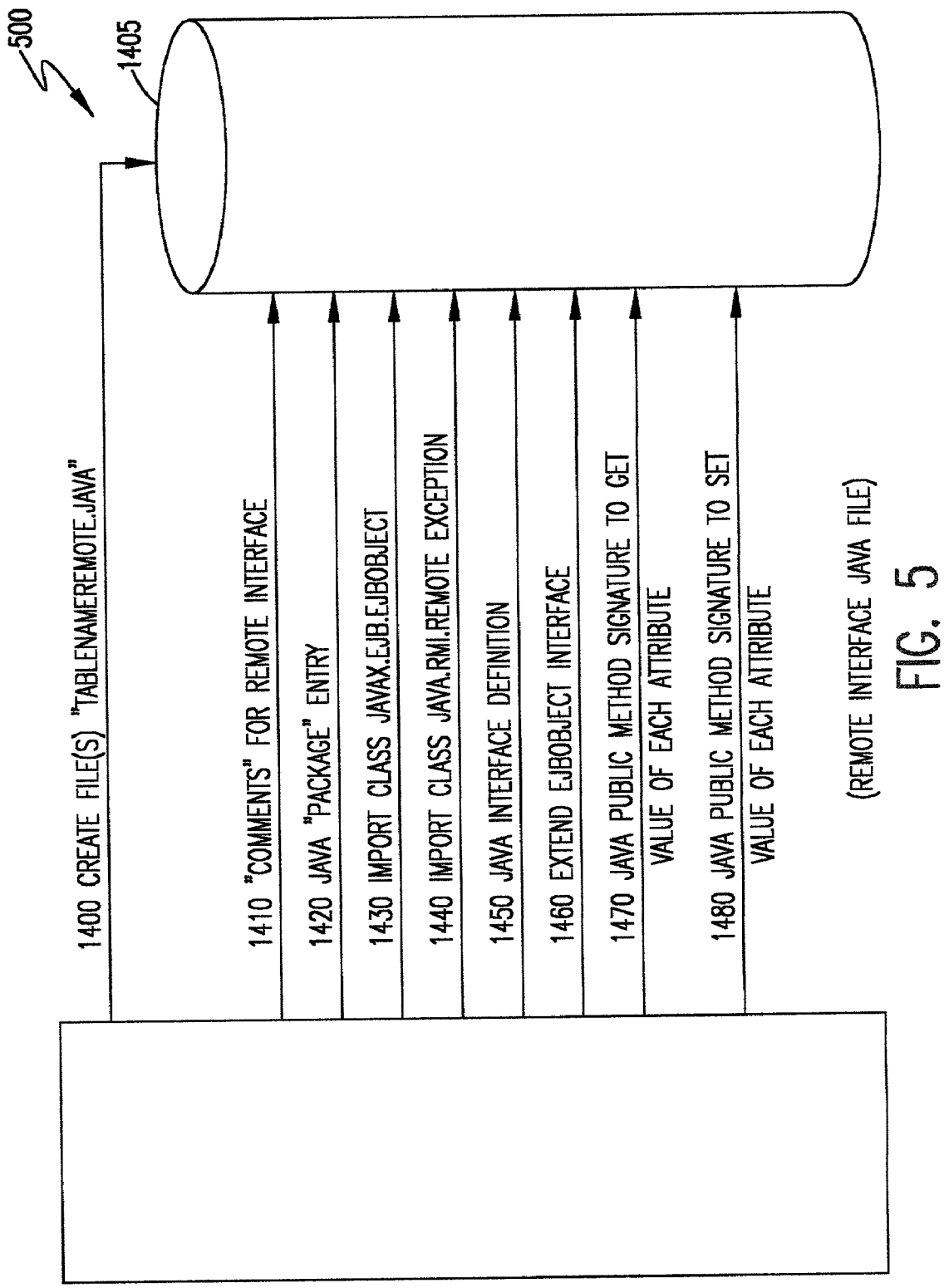

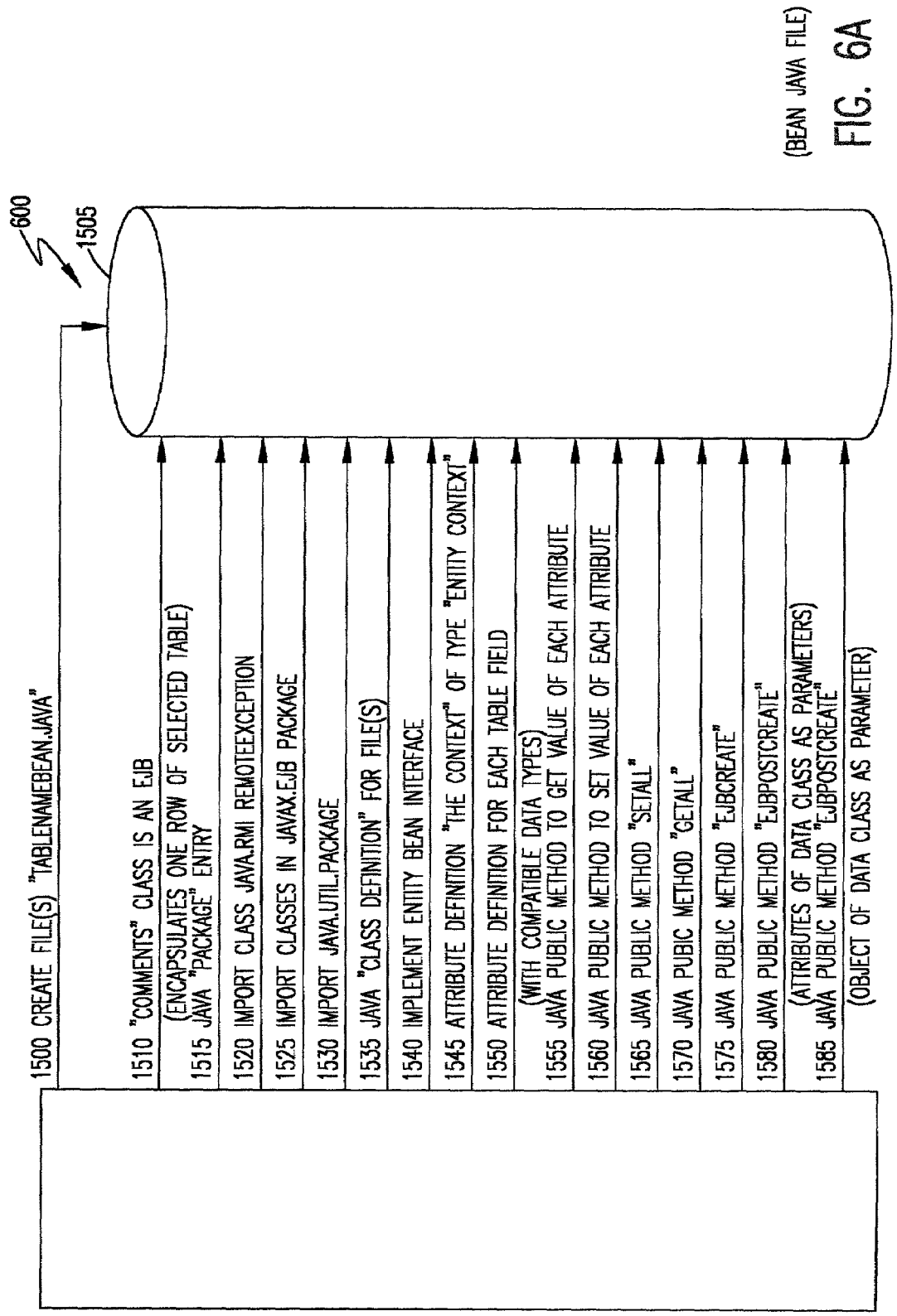
FIG. 6A (BEAN JAVA FILE)

(BEAN JAVA FILE)

(PRIMARY KEY JAVA FILE)

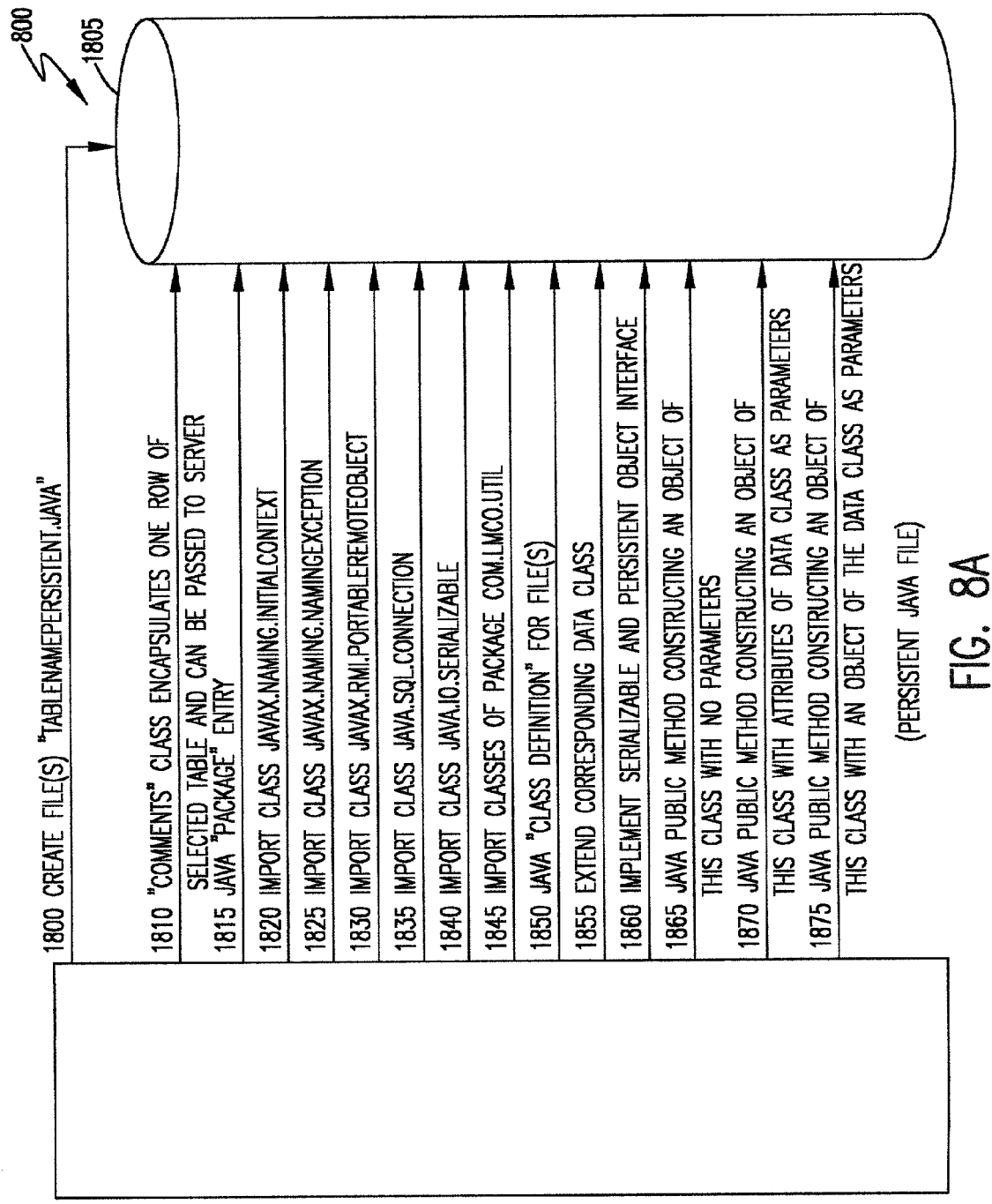
FIG. 8A (PERSISTENT JAVA FILE)

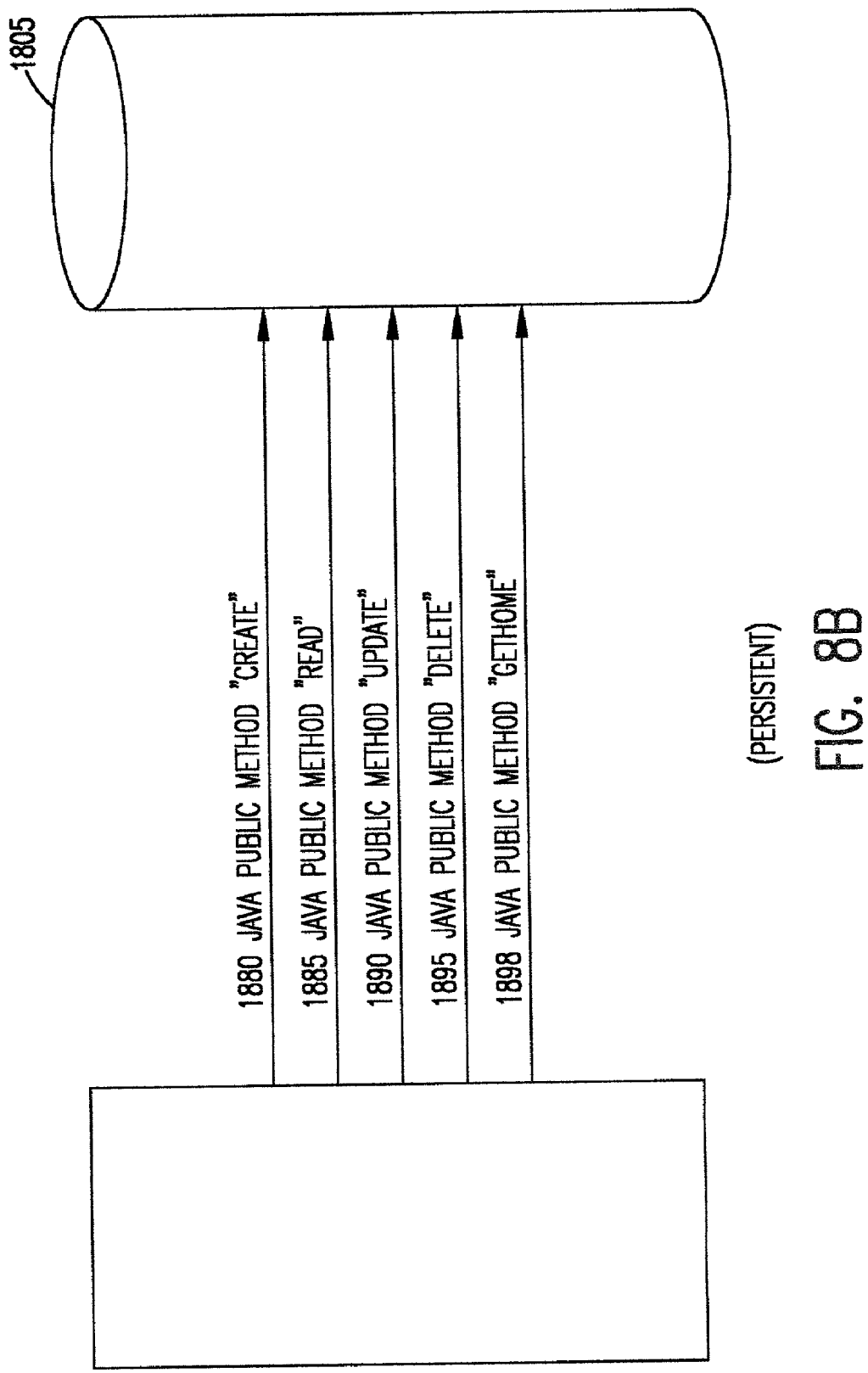
FIG. 8B (PERSISTENT)

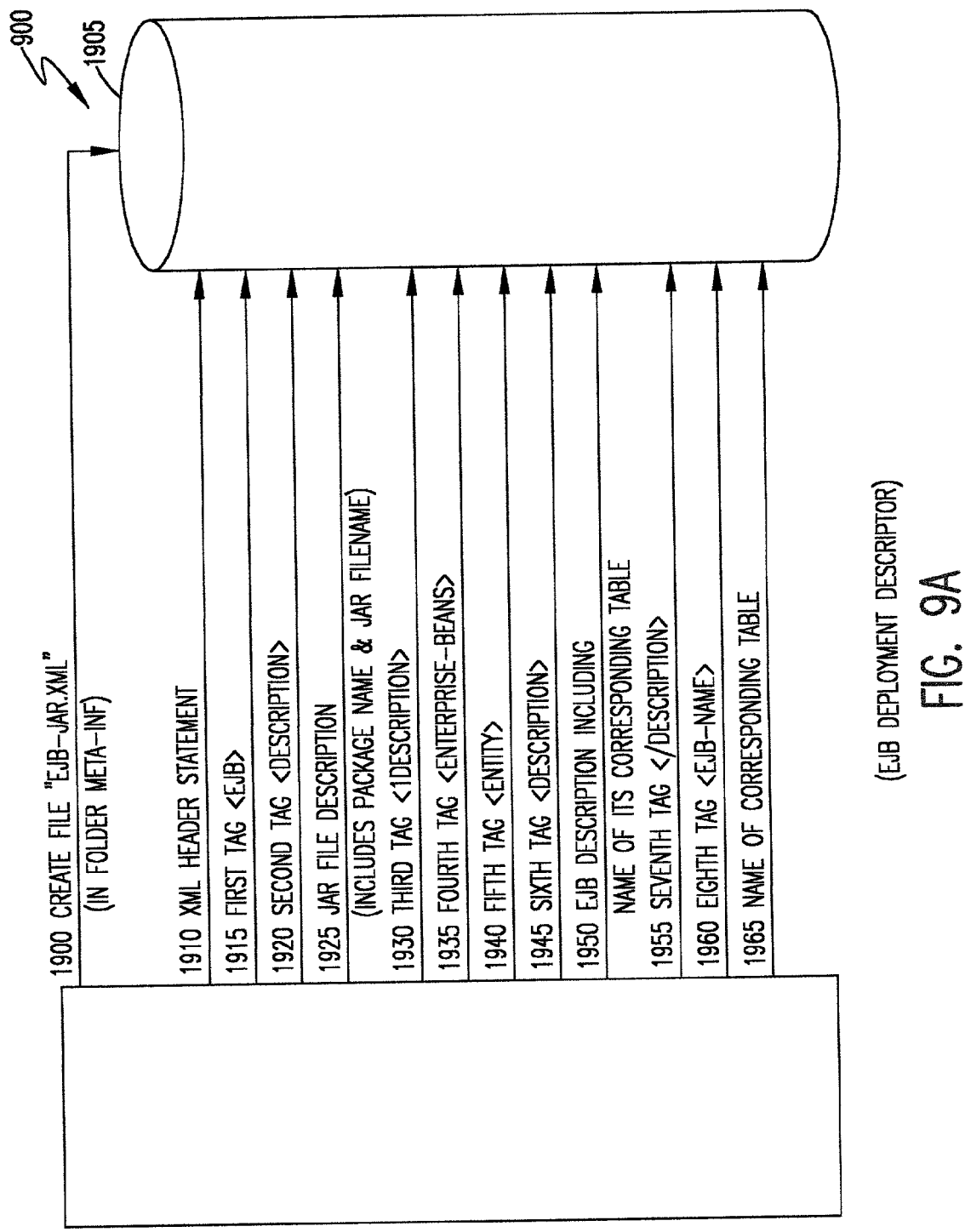
FIG. 9A (EJB DEPLOYMENT DESCRIPTOR)

(EJB BATCH COMMAND FILE)

(VENDOR SPECIFIED BUILD FILE)

PROCESS FOR GENERATING ENTERPRISE JAVA BEAN COMPONENTS FROM AN SQL DATABASE

BACKGROUND OF THE INVENTION

1. Field of the Invention

The invention generally relates to data processing such that database tables from one application can be accessed by another application possibly developed using a different programming language and, more particularly, to converting SQL databases to Enterprise JAVA Beans and referred to as database application conversion.

2. Background Description

JAVA is rapidly becoming one of the most important computer languages and has become a language of choice for internet applications. As users rely more and more on JAVA, they find a need to convert existing database applications to the JAVA database model, known as Enterprise JAVA Beans or EJB's. A large percentage of computers and personal computers, in particular run at least one database application and many users have accumulated numerous extensive databases for which network (e.g. Internet) access may be considered desirable. However, such access may not be possible without conversion to a standardized format such as the JAVA database model even where the database may be developed using a structured query language (SQL), adhered to by many databases.

However, the conversion of databases, including SQL databases, to such a model has required extensive manual input which is time-consuming and likely to result in errors. For example, auxiliary files must be produced to deploy the EJB's and referential integrity of the original database must be ensured. Moreover, these requirements and coordination between the database and the JAVA code can only be validated by a lengthy process of rigorous testing. The present state of the art does not support a simple, reliable, rapid method for performing the conversions, particularly in the volume that may be desired.

SUMMARY OF THE INVENTION

It is therefore an object of the invention to provide a substantially automated tool for conversion of databases applications, including SQL databases, to database models accessible through applications in languages compatible with network and internet communications and for conversion of SQL databases to enterprise Java Bean (EJB) files, in particular.

It is another object of the invention to provide a computer implemented method for conversion of databases, including SQL databases, to database models accessible through applications in languages compatible with network and internet communications and for conversion of SQL databases to enterprise Java Bean (EJM) files, in particular.

It is a further object of the invention to provide a user interface for facilitating control of automated database file conversion by a data processing system.

It is yet another object of the invention to provide an arrangement by which database conversion can be performed in response to the execution of software in the target conversion language.

In order to achieve the above and other objects of the invention, a method is provided comprising the steps of invoking a computer application program to read table definitions from a database; the computer application program using existing database definitions to define object classes and deployment descriptors, the computer application program producing a client-side helper class to coordinate the name used in a Naming and Directory Service with a client code.

BRIEF DESCRIPTION OF THE DRAWINGS

The foregoing and other objects, aspects, and advantages will be better understood from the following detailed description of a preferred embodiment of the invention with reference to the drawings, in which:

FIG. 4 is a data flow diagram illustrating generation of a home interface JAVA file in accordance with the invention, FIG. 5 is a data flow diagram illustrating generation of a remote interface JAVA file in accordance with the invention, FIGS. 6A and 6B is a data flow diagram illustrating generation of a Bean JAVA file in accordance with the invention, FIGS. 8A and 8B are data flow diagrams illustrating generation of a persistent JAVA file in accordance with the invention, FIGS. 9A, 9B and 9C are data flow diagrams illustrating generation of an EJB deployment descriptor in accordance with the invention.

DETAILED DESCRIPTION OF A PREFERRED EMBODIMENT OF THE INVENTION

Figure 1A:
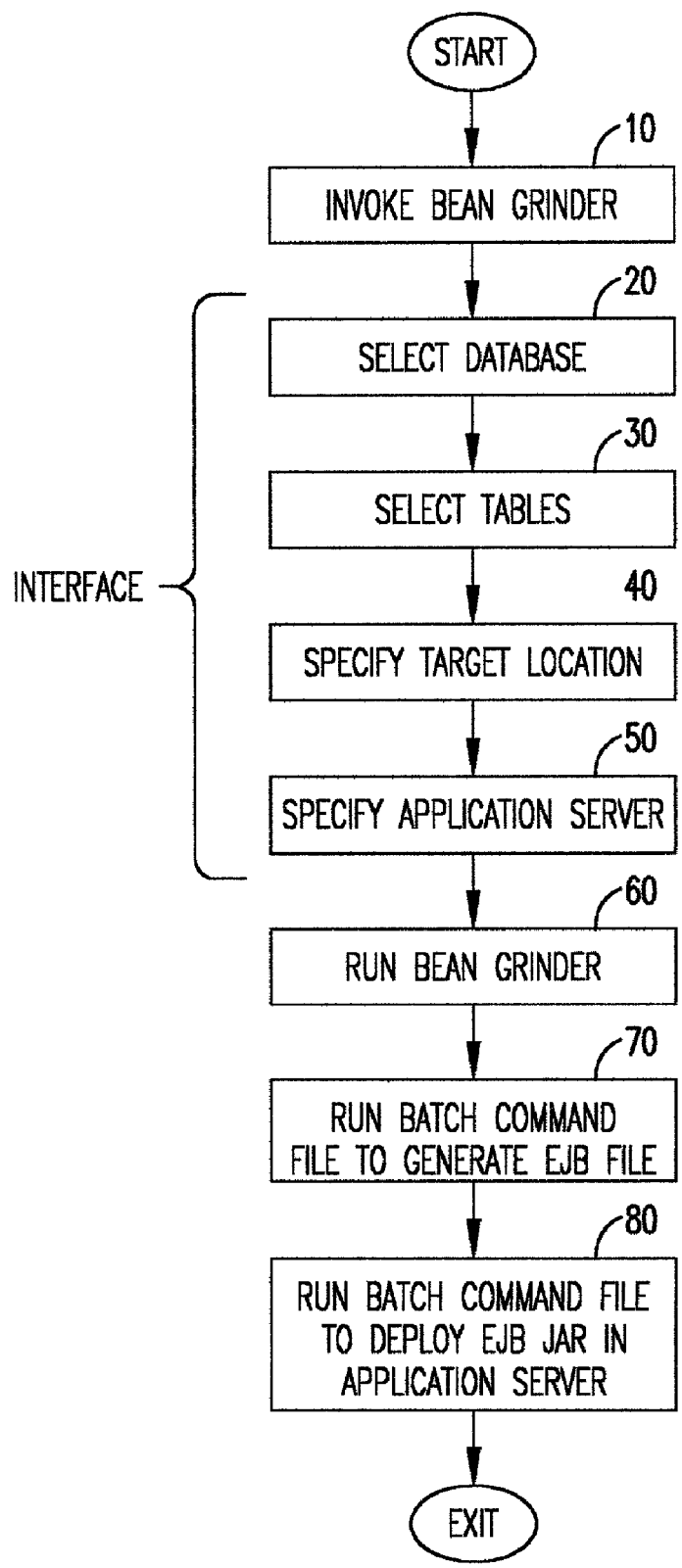
FIG. 1A is a flowchart of the overall flow of control through the Bean Grinder.

Referring now to the drawings, and more particularly to FIG. 1, there is shown an overall flowchart of the program in accordance with the invention. According to the invention, SQL databases are presented to the BeanGrinder. The user selects which databases to convert to Enterprise JAVA Beans or EJB's. EJB's consist of several files of JAVA source code and an XL (Extended Markup Language) deployment descriptor. EJB's are key components for the new JAVA Enterprise Edition architecture which will be a key component of Electronic Commerce solutions for the near future. By automating the process of conversion and because it, in essence, reverses the conventional method of conversion by working from the database specification to the EJB, the BeanGrinder reduces days or weeks of tedious software development to minutes. The BeanGrinder eliminates the error-prone job of developing application source code synchronized with the names and data-types of fields defined in the database. Flow through the program is essentially linear and therefore executes rapidly Essentially, once invoked, the database specifications such as database identification and passwords, tables, key fields and the like are obtained from storage and the information parsed into numerous files that may be necessary to access them using a different, network communication compatible application and language and compiles and executes some of those files, as necessary for the target application/language. It is an important feature of the present invention that these functions are performed by and responsive to execution of a program in the language which is the target language of the database application conversion. Since conversion of SQL databases into EJB's is relatively complex because of its wider scope of compatibility and such conversion is a preferred embodiment of the invention, the invention will be described in connection with conversion between those standards, from which those skilled in the art will be enabled to practice the invention in other environments.

As an overview of the invention, as shown in FIG. 1A, when it is desired to convert database files, the user invokes the Bean Grinder 10. A dialog with the user is then conducted to assemble necessary information in a plurality of steps within the bracket in FIG. 1A labeled as an interface including steps 20–50. Specifically, the program presents the user with databases from which a selection 20 can be made. The user selects the databases to be converted. Then the user is presented with tables from which to select 30. After selecting the tables, the user specifies (40) the target location, that is, where the EJB's will be stored. The user then specifies (50) the application server on which the application will be run. Then the user begins the process of conversion by running the BeanGrinder 60, an overview of which is shown in FIG. 1AA. Then, once the BeanGrinder 60 has been run, the program runs the batch command file to generate the EJB file 70. Last, the program runs another batch command file to deploy the EJB Jar (Java ARchive) file in the application server 80, after which the program exits.

As an alternative embodiment, it may be desirable for the step Run Batch Command File to Generate EJB files 70 and Run Batch Command File to Deploy EJB Jar in Application Server 80 to be integral to the Bean Grinder 60 and to be executed without further operator intervention. However, for illustrative purposes, processes 70 and 80 are illustrated separately from Bean Grinder 60 and, in such case, the user must initiate execution of the Run Batch Command steps 70 and 80. Implementation of the invention in either embodiment is preferably by a computer program run on a general purpose computer but those skilled in the art will recognize that special purpose hardware could also be used to implement the invention.

Figure 1B:
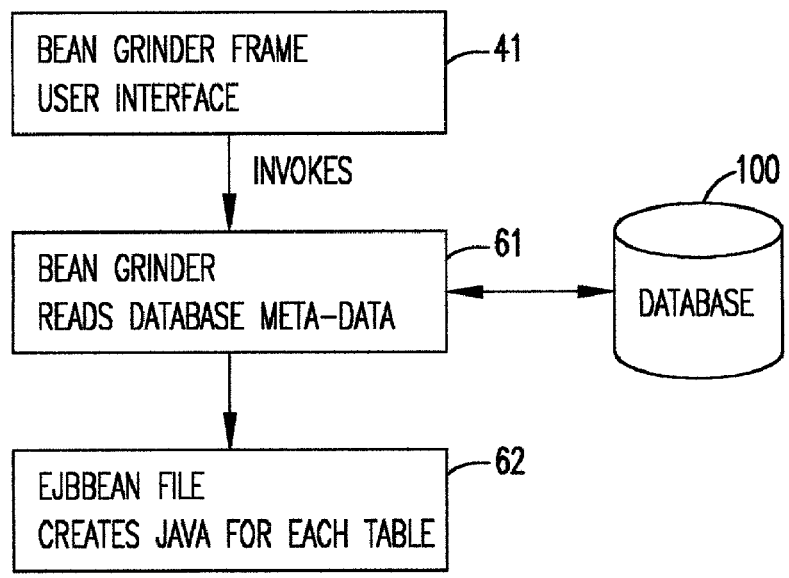
FIG. 1B is a high-level block diagram or functional flow diagram of the invention.

Regardless of implementation, the organization of the preferred embodiment of the invention is shown in FIG. 1B. In this organization, the interface, referred to as the Bean Grinder Frame 41, gathers data from the user as to how the Bean Grinder is to function. In response thereto, the Bean Grinder communicates with a specified database and reads the meta-data thereof as shown at 61 and an EJB Bean File 62 creates JAVA files for each table. That is, an EJBBeanFile generates the JAVA class files for one EJB which, in turn, corresponds to a database table.

Figure 1C:
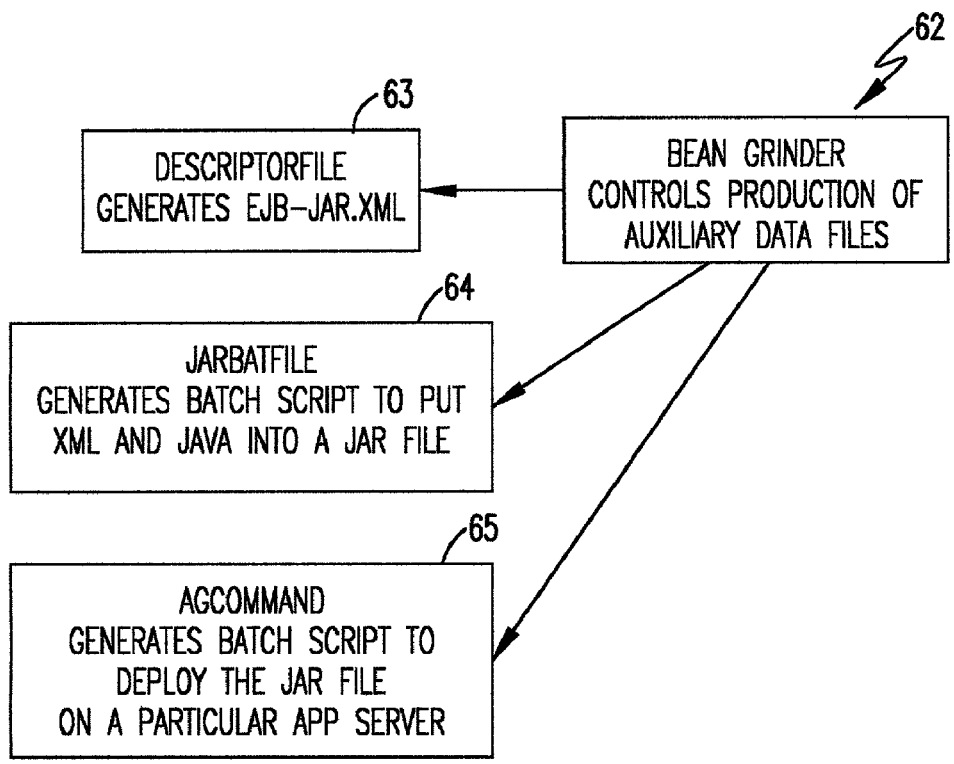
FIG. 1C is a high level functional flow diagram of auxiliary file production in accordance with the invention.
Figure 1D:
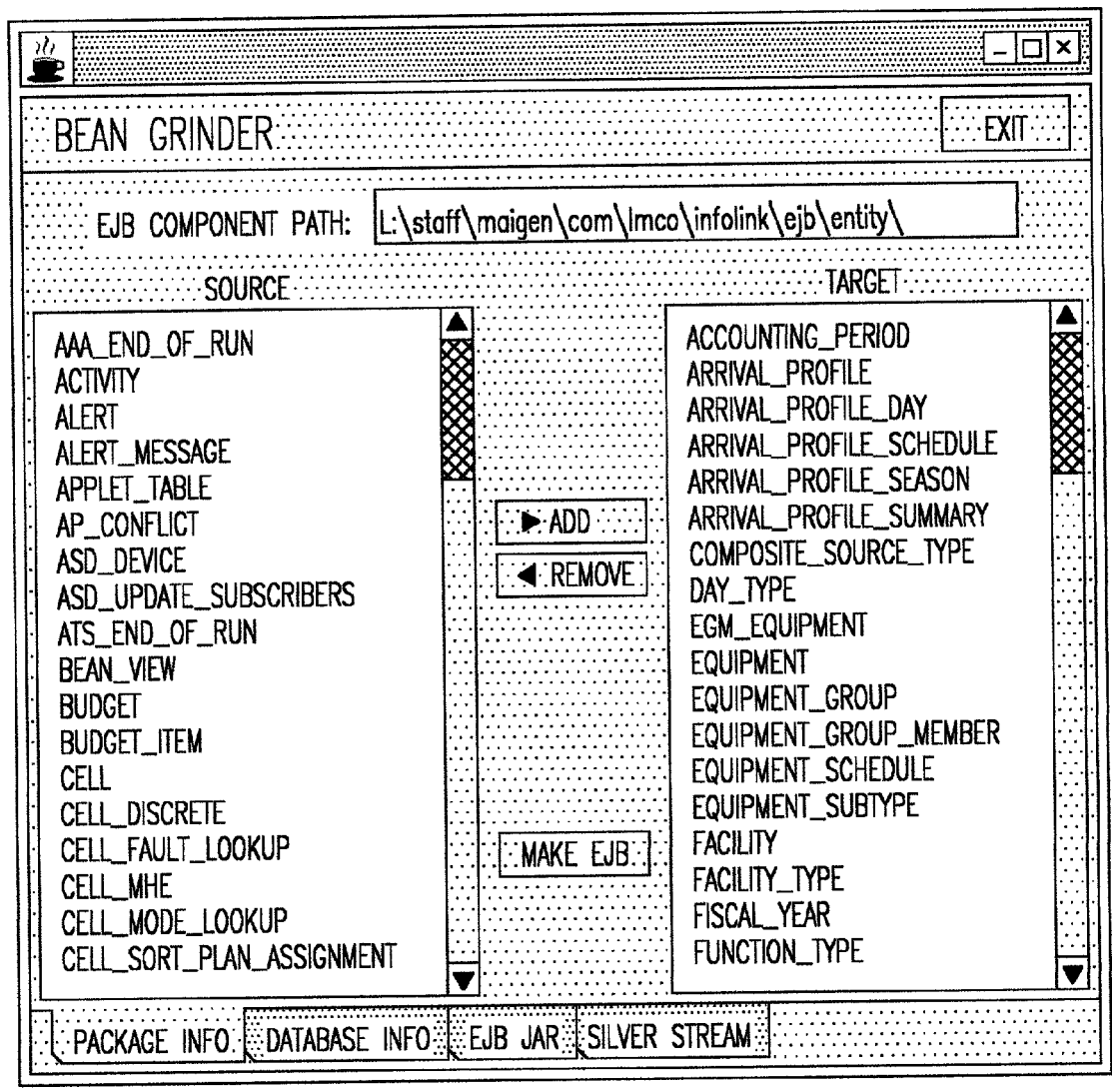
FIG. 1D is an exemplary control panel display of an interface in accordance with a preferred form of the invention.
Figure 1E:
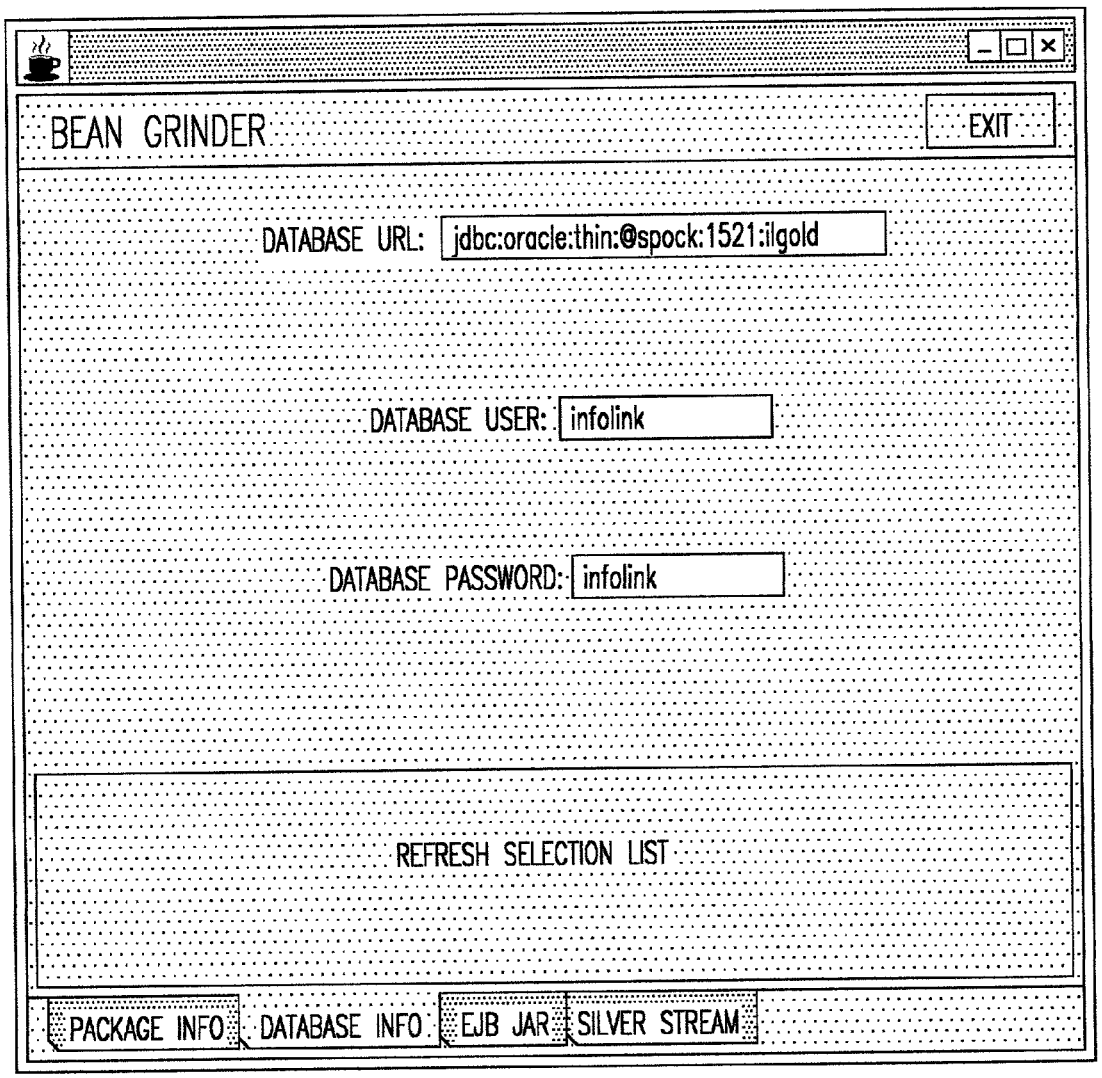
FIGS. 1E, 1F and 1G are exemplary information panels of a user interface in accordance with the invention.
Figure 1F:
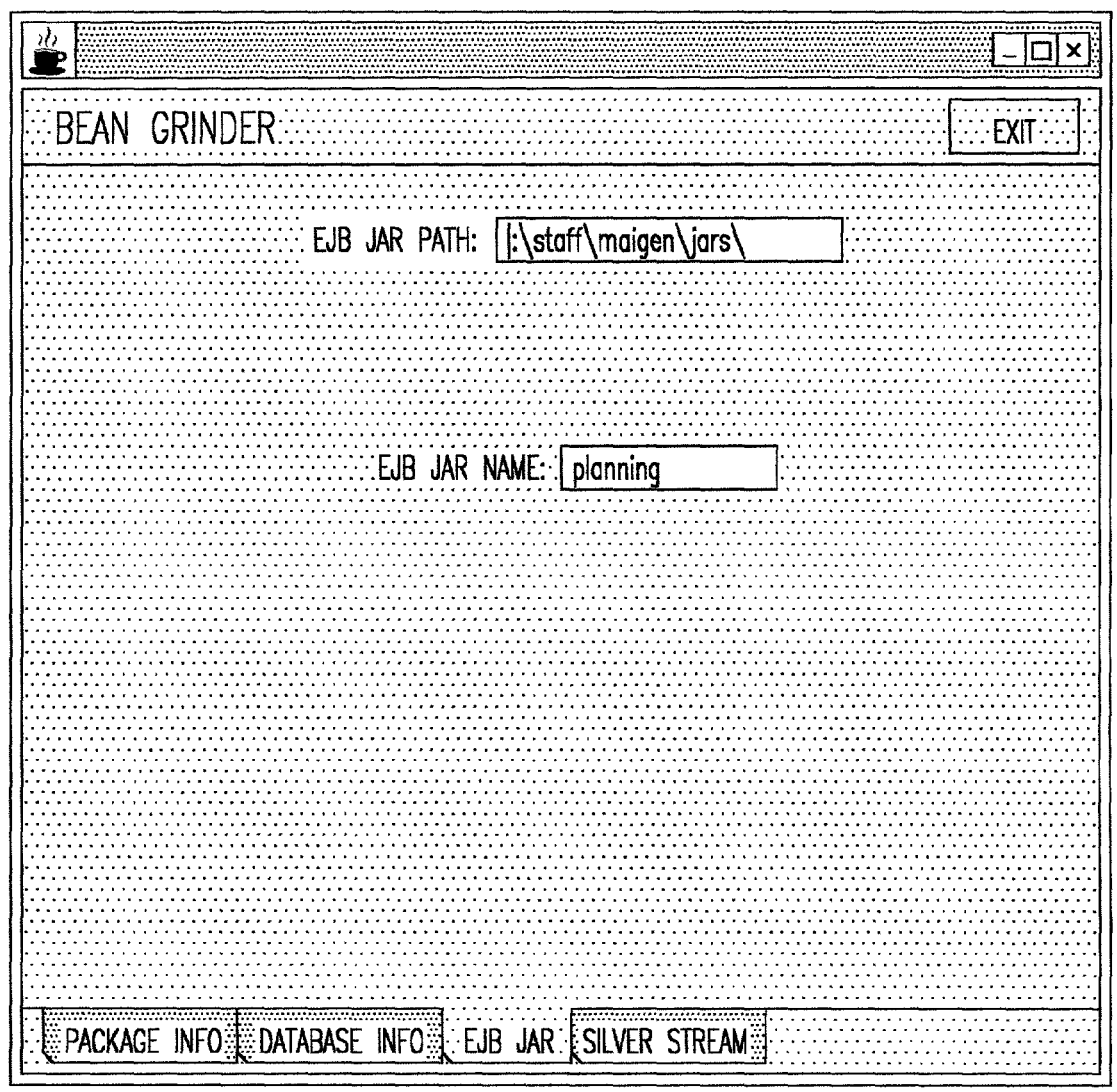
Figure 1G:
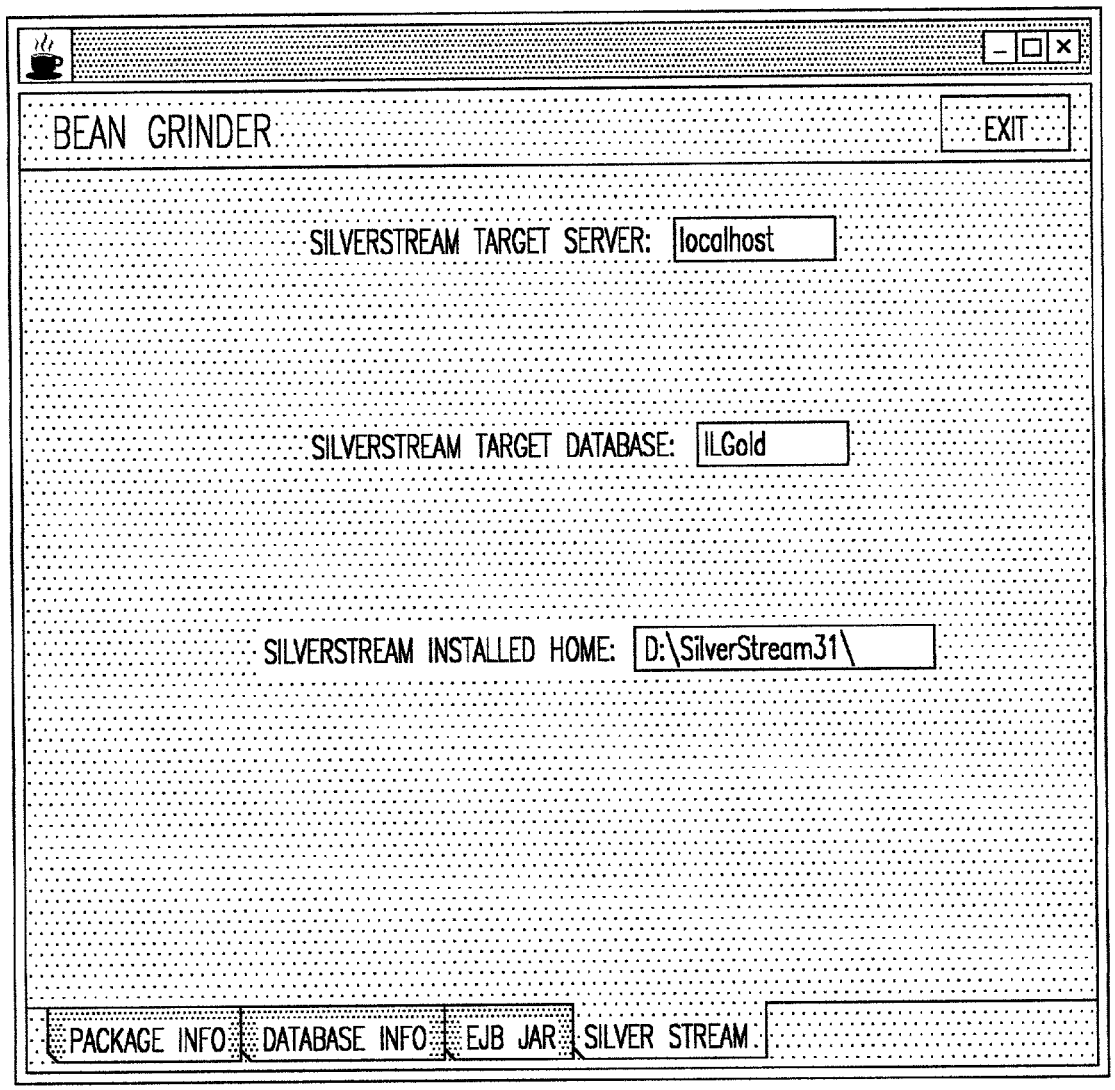

This function of producing auxiliary files is divided into three basic sections as shown in FIG. 1C. Specifically, under control of a portion 62 of Bean Grinder 60, a descriptor file 63 (DescriptorFile) generates an XML deployment descriptor, a batch file 64 (JarBatFile) generates batch script to compile JAVA into CLASS files and compress the CLASS files into a JAR file and an an AGCommand 65 generates commands to import and deploy the EJB JAR file into a particular application server. AGCommand is one of two classes which produce data to assist in integrating the EJB's into a particular application server. The other is AGDeploy which generates a supplemental XML deployment file for a specific application server.

FIGS. 1D–1G are exemplary screens for collection of information from a user for control of the Bean Grinder 60 to function as desired. In general, it is considered to be preferable to collect all such information upon invocation 10 of the Bean Grinder since, as alluded to above, the program is substantially linear and executes very quickly. Collecting information as needed would, in most cases, unduly and unacceptably slow the execution thereof Further, since the program in accordance with the invention is very computationally intensive and generates and stores many files, it is desirable to collect all information to insure that the specification of the function is complete before allowing the data processing to be initiated.

Figure 1H:
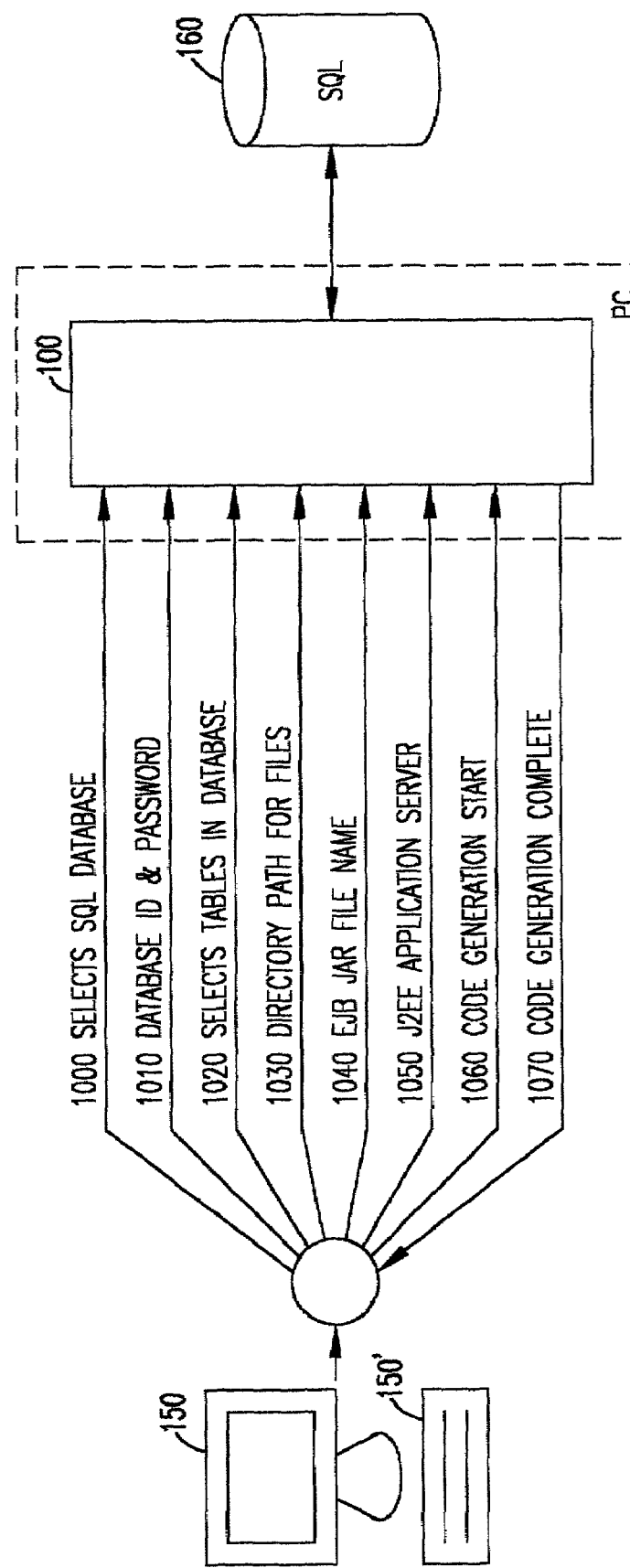
FIG. 1H is a detailed data flow diagram in accordance with a preferred embodiment of the invention helpful in understanding FIGS. 1B–1G, FIG. 1AA is a flow diagram of the Bean Grinder step 60 of FIG. 1A.
Figure 1A:
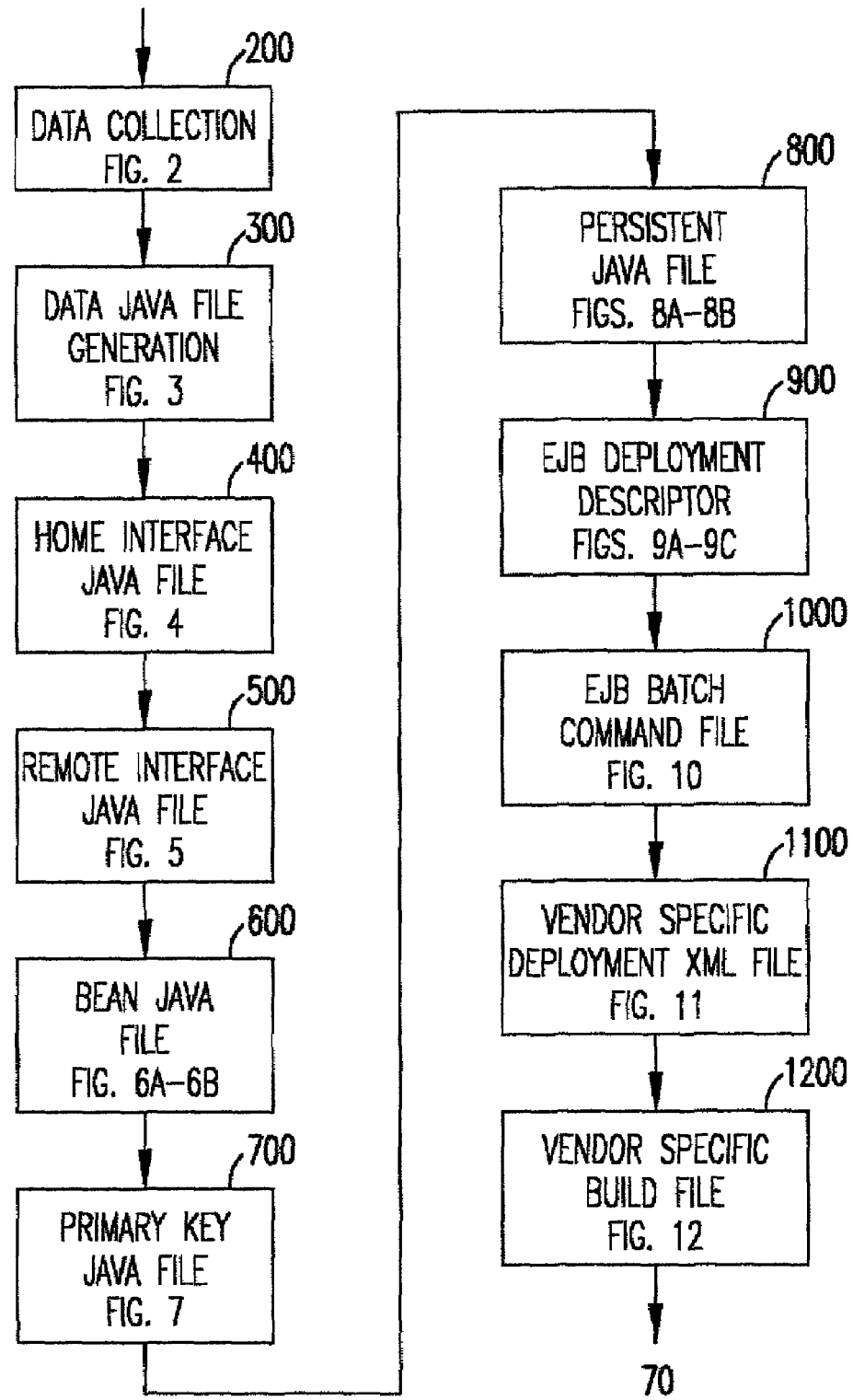

FIG. 1H details the communications between user terminal 150, 150', host processor 100 and SQL databases 160. The Bean Grinder is resident in processor 100 and is invoked 10 by normal communications between keyboard 150', processor 100 and display 150 and need not be further described or illustrated. Upon invocation 10 of the Bean Grinder, processor 100 accesses and communicates with SQL databases 160 as needed, placing retrieved information into the screens of FIGS. 1D–1G which are displayed for user input. For example, upon invoking the Bean Grinder, the first access of SQL databases will generally return the names or identifiers of existing databases and access information field queries which are presented to the user by means of the screen of FIG. 1D or other prompt into which the information is inserted as a menu or the like. Then, the user selects, in sequence, the database(s) to be operated upon (20, I1000), including the database ID and password (I1010), the tables of the selected database (30, I1020), the target location 40 by directory path (I1030) and EJB Jar file name (I1040), and, finally the Java 2 Platform, Enterprise Edition (J2EE) application server (I1050). Once these selections are successfully made, the Bean Grinder processing may be initiated (1060), for example by pressing/clicking a button on the display. (Other such buttons preferably provided include a button for refreshing the table selection after switching databases and an exit button by which the process may be interrupted/aborted.) When processing is complete, an appropriate communication will be sent 1070 to the user terminal display. The application program then saves the information the user enters so the information can be used from session to session.

Referring now to FIG. 1AA, the Bean Grinder preferably includes a linear sequence of processes including data collection 200, data JAVA file generation 300, home interface JAVA file generation 400, remote interface JAVA file generation. 500, Bean JAVA file generation 600, primary key JAVA file generation 700, persistent JAVA file generation 800, EJB deployment descriptor generation 900, EJB batch command file generation 1000, vendor specific XML deployment file generation 1100 and vendor specified build file generation 1200. These steps will be detailed below in connection with FIGS. 2–12, respectively. As an overview, the Bean Grinder will look in the TAB meta-data table for all selected tables in the target database. For each selected table, a list of fields will be determined for the table by using the SQL keyword DESCRIBE. Then, it will be determined if each field is a primary key of that table by querying USER_CONSTRAINTS meta-table data Each selected table will be used to construct a corresponding EJBBeanFile object and each field will correspond to an attribute object. Methods (in the JAVA sense) in the EJBBeanFile are then invoked to generate JAVA source code. Similarly, Methods in DescriptorFile generate an XML deployment descriptor and methods in JarBatFile generate a command script to compile the source files and build the JAR file.

Figure 2:
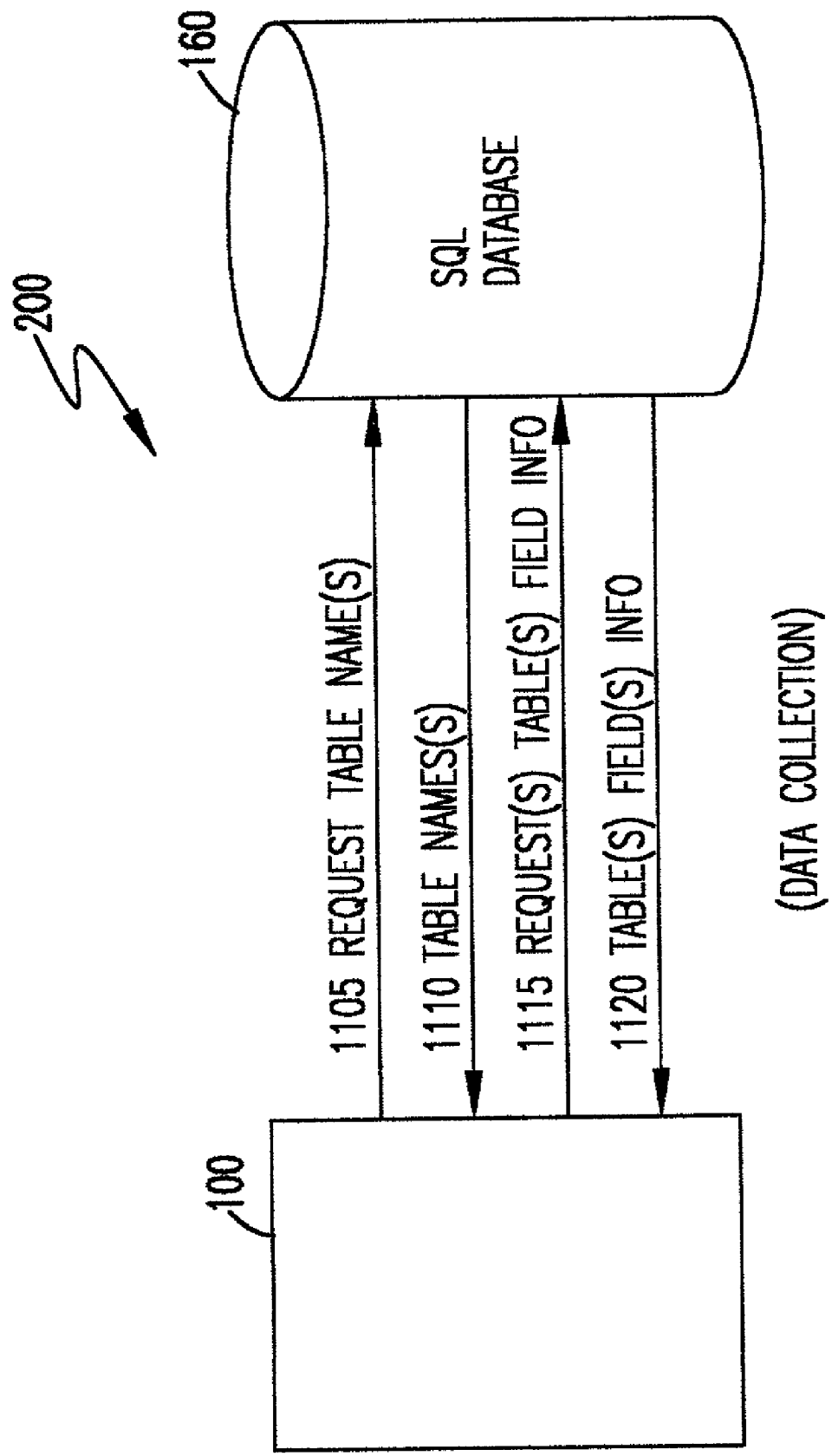
FIG. 2 is a data flow diagram illustrating data collection for operation in accordance with a preferred embodiment of the invention.

Referring now to FIG. 2, the preferred embodiment of the data collection includes the following functions:

the application program querying 1105 the database 160 to get 1110 names of all tables related the database for a user to encapsulate the tables with an EJB;

and querying 1115 the database 160 to acquire 1120 information about fields within each table the user has selected, as shown in FIG. 2. This provides the information concerning tables and fields in the selected database(s) as alluded to above to support construction of an EJBBeanFile object from each table and an attribute object from each field. Each EJBBeanFile has a collection of such attribute objects which are assigned to it by the Bean Grinder. The EJBBeanFile also has methods to create JAVA source files for one EJB including a data file, an interface file which will be shared by the bean and the remote interface, a home interface file having "create" and "finder" methods, a Bean file which implements the home and remote interfaces, a Primary Key file which has a subset of attributes of the bean, a persistent file which extends the data file and has methods to create, read, update, and delete data and shields the client from having to access the home and remote interfaces, and a list file which is a collection of persistent objects. These types of files (and counterparts in other programming languages) will be familiar to those skilled in the art of object oriented computer programming. It should also be recognized that the development of these types of files is depicted in FIGS. 3–12.

Figure 3:
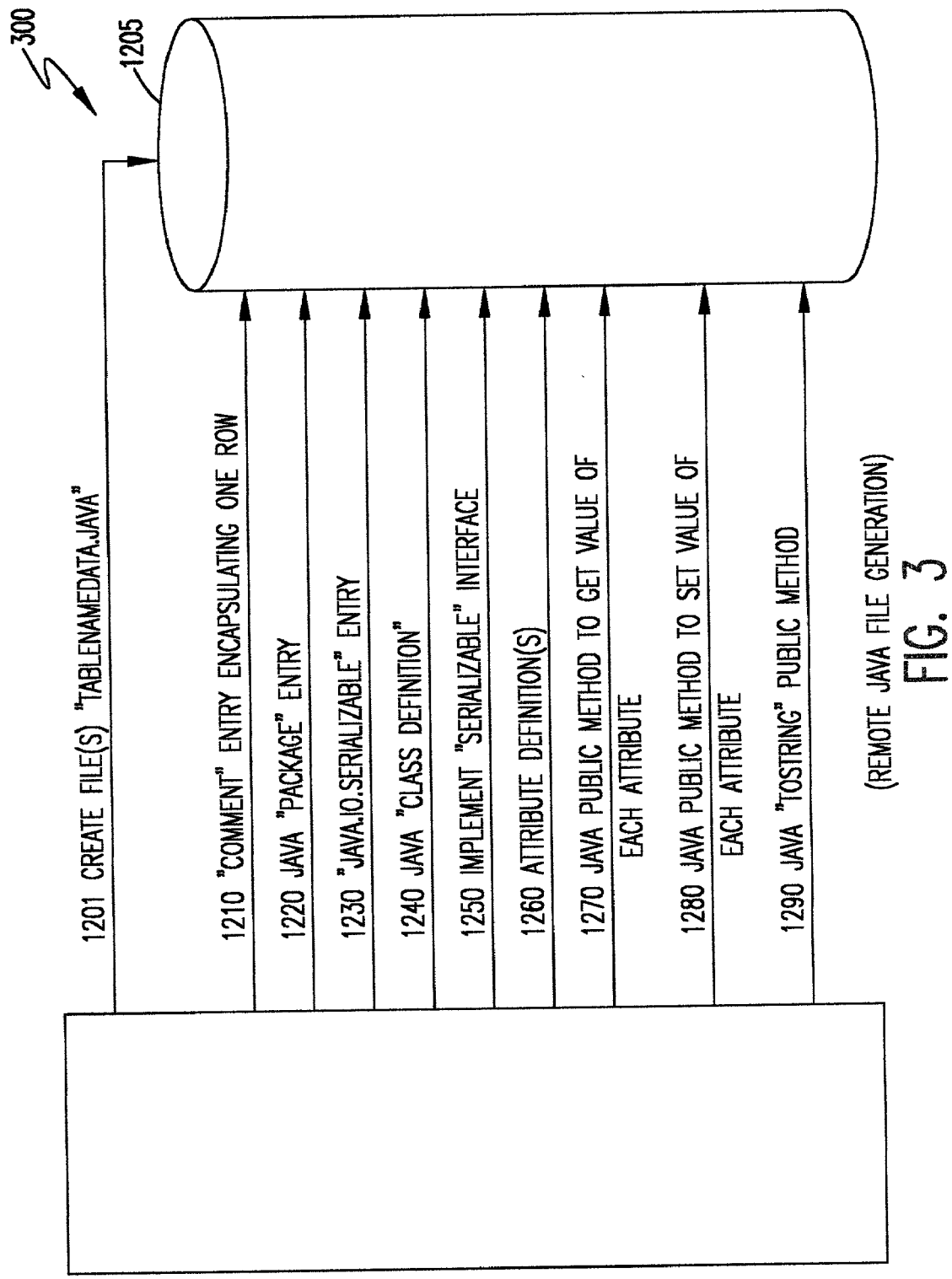
FIG. 3 is a data flow diagram illustrating data Java file generation in accordance with a preferred embodiment of the invention.

As shown in FIG. 3, the preferred embodiment for generating the Data JAVA file consists of the following functions:

generating a file with filename equal to the table name followed by the word 'Data' and file extension 'java' 1201;

writing header comments 1210 indicating that a JAVA class encapsulates one row of the selected table;

writing a JAVA package definition 1220 consistent with the user-specified directory path;

writing a JAVA statement 1230 to import the java.io.Serializable class writing a JAVA class definition 1240 with the class name equal to the file name;

writing a JAVA statement 1250 indicating that the class implements the Serializable interface;

writing a corresponding attribute definition 1260 for each one of one or more fields in the selected table and ensuring that the JAVA data type of each one of one or more attributes shall be compatible with the database data type of a corresponding field and that the name of each one of one or more attributes shall be identical to the name of the corresponding field;

writing a JAVA public method 1270 to get the value of each one of one or more attributes;

writing a JAVA public method 1280 to set the value of each one of one or more attributes; and writing a JAVA public method 1290 named "toString" to return a string representing the Data class. These JAVA constructs are stored in one or more memories 1205 which may or may not be the same physical hardware as that in which database 160 is originally stored.

As shown in FIG. 4, the preferred embodiment of the Home Interface JAVA file is developed by performing the following functions, for each one of one or more selected tables, generating a file 1300 with filename equal to the table name followed by the word "Home" and file extension "java";

writing header comments 1310 indicating that the JAVA class is the Home Interface for the Bean encapsulating the selected table;

writing a JAVA package definition 1315 consistent with the user-specified directory path;

writing JAVA statements to import the following classes:
javax.ejb.EJBHome 1320;
javax.ejb.FinderException 1325;
javax.ejb.CreateException 1330;
java.rmi.RemoteException 1335;
java.util.Collection 1340, writing a JAVA interface definition 1345 with an interface name equal to the file name;

writing a JAVA statement 1350 indicating that the class extends the EJBHome interface;

writing a JAVA method signature 1355 named "create" which takes as parameters the attributes of Data class and return's an object of Remote class;

writing a JAVA method signature 1360 named "create" which takes as a parameter an object of Data class and returns an object of Remote class, and writing a JAVA method signature 1370 named "findByPrimaryKey" which takes as a parameter an object of PrimaryKey class and returns an object of Remote class wherein writing the JAVA method signature named "findByPrimaryKey" has only one primary key. The application makes the parameter the corresponding attribute of Data class. These JAVA constructs are stored in storage 1305 which may or may not be the same as that used for database 160.

The preferred embodiment for generating the Remote Interface JAVA file is performed by executing the following functions, as shown in FIG. 5:

generating 1400, for each selected table, a file with filename equal to the table name followed by the word "Remote" and the file extension "java";

writing header comments 1410 indicating that this JAVA class is the Remote interface for the Bean encapsulating the selected table;

writing a JAVA package definition 1420 consistent with the user-specified directory path;

writing one or more JAVA statements 1440 to import the following classes:
javax.ejb.EJBobject;
java.rmi RemoteException;

writing a JAVA interface definition 1450 with the interface name equal to the file name;

writing a JAVA statement 1460 indicating that the class extends the EJBObject interface;

writing a JAVA public method signature 1470 to get a value of each attribute and wherein the signature shall indicate that the method may throw a Remote Exception; and writing a JAVA public method to set the value of each attribute signature and wherein the signature shall indicate that the method may throw a Remote Exception. These JAVA constructs are stored in one or more storage areas 1405 which, similarly may or may not physically be the same storage used for database 160.

Figure 6B:
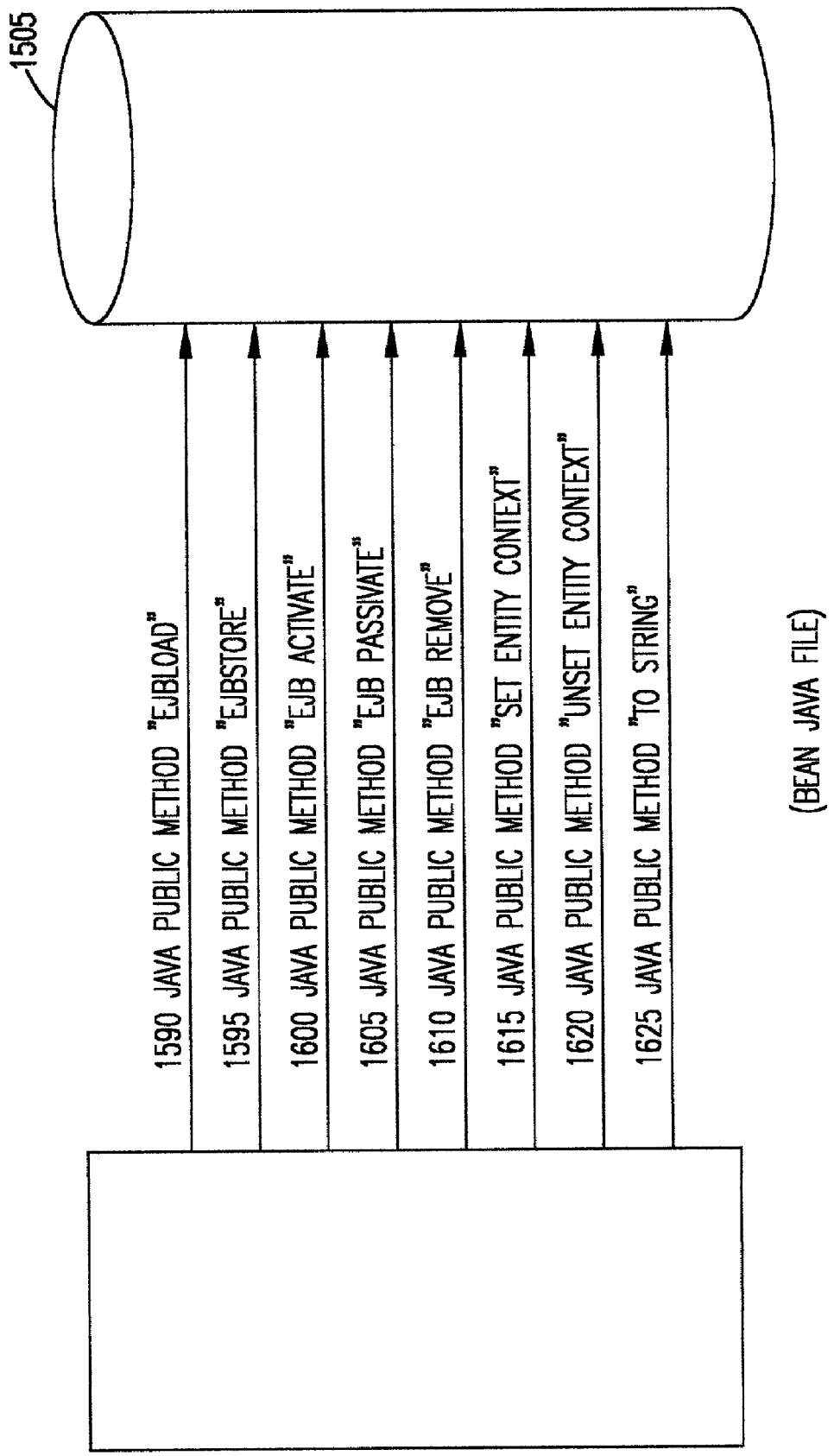
Figure 7:
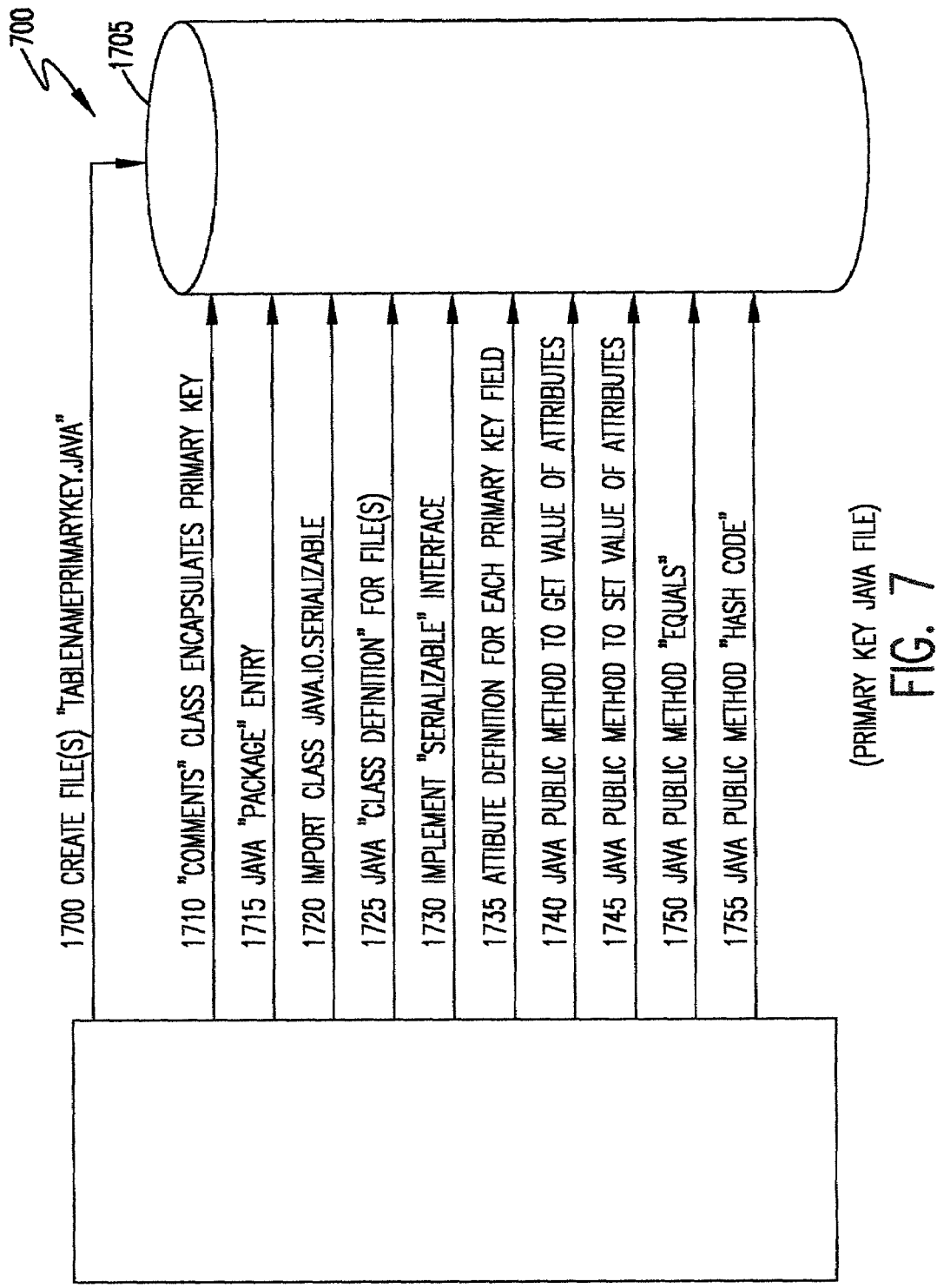
FIG. 7 is a data flow diagram illustrating generation of a primary key JAVA file.

As shown in FIGS. 6A and 6B, the preferred embodiment for generating the Bean JAVA file is performed by executing the following functions:

generating, for each selected table, a file 1500 with filename equal to the table name followed by the word "Bean" and file extension "java";

writing header comments 1510 indicating that the JAVA class is an EJB which encapsulates one row of the selected table;

writing a JAVA package definition 1515 consistent with the user-specified directory path;

writing a JAVA statement to import the following classes: java.rmi.RemoteException 1520;
all classes in the javax.ejb package 1525; and
all classes in the java.util package 1530;

writing a JAVA class definition 1535 with the class name equal to the file name;

writing a JAVA statement 1540 indicating that the class implements the EntityBean interface;

writing an attribute definition 1545 for an attribute named "theContext" of type "EntityContext";

writing 1550, for each field in the selected table, a corresponding attribute definition, ensuring that the JAVA data type of each attribute shall be compatible with the database data type of the corresponding field and ensuring that each attribute shall be identical to the name of the corresponding field in lower case;

writing a JAVA public method 1555 to get the value of each attribute;

writing a JAVA public method to 1560 set the value of each attribute;

writing a JAVA public method 1565 named "setAll" which has an object of Data class.as parameter and can throw a Remote Exception and wherein each attribute of Bean class shall be set to the value of the corresponding Data attribute;

writing a JAVA public method 1570 named "getAll" which returns an object of Data class and can throw a Remote Exception;

writing a JAVA public method 1575 named "ejbCreate" with the attributes of Data class as parameters and the signature of this method says it returns an object of type "String" but the body of the method must return "null" and this method can throw a Create Exception and a Remote Exception;

writing a JAVA public method 1580 named "ejbPostCreate" with the attributes of Data class a parameters and the signature of this method says it returns an object of type "String" but the body of the method must return "null" and this method can throw a Create Exception and a Remote Exception;

writing a JAVA public method 1585 named "ejbPostCreate" with an object of Data class as the parameter and the signature of this method says it returns an object of type "String" but the body of the method must return "null" and this method can throw a Create Exception and a Remote Exception;

writing a JAVA public method 1590 named "ejbLoad" which can throw an EJB Exception or a Remote Exception and the body of this method may be empty;

writing a JAVA public method 1595 named "ejbStore" which can throw an EJB exception or a Remote exception and the body of this method may be empty;

writing a JAVA public method 1600 named "ejbActivate" which can throw an EJB Exception or a Remote Exception and the body of this method can be empty;

writing a JAVA public method 1605 named "ejbPassivate" which can throw an EJB Exception or a Remote Exception and the body of this method can be empty;

writing a JAVA public method 1610 named "ebRemove" which can throw an EJB Exception or a Remote Exception and the body of this method can be empty;

writing a JAVA public method 1615 named "setEntityContext" which can throw an EJB exception or a Remote Exception and the parameter for this method is an object of type EntityContext and is used to set theContext;

writing a JAVA public method 1620 named "unsetEntityContext" which can throw an EJB Exception or a Remote Exception and this method sets theContext to "null"; and writing a JAVA public method 1625 named "toString" to return a string representing the Bean class. These JAVA constructs are stored in one or more memories 1505 which may be in arbitrary hardware.

The preferred embodiment for generating the Primary Key JAVA file is performed by executing the following functions:

generating a file 1700 for each selected table with more than one primary key field such that the filename is made equal to the table name followed by the word "PrimaryKey" and file extension "java";

writing header comments 1710 indicating that this JAVA class encapsulate the Primary Key of the selected table;

writing a JAVA package definition 1715 consistent with the user-specified directory path;

writing a JAVA statement 1720 to import the java.io.Serializable class;

writing a JAVA class definition(s) 1725 with the class name equal to the file name;

writing a JAVA statement 1730 indicating that the class implements the Serializable interface;

writing a corresponding attribute definition 1735 for each primary key field, ensuring that the JAVA data type of each attribute is compatible with the database data type of the corresponding field and ensuring that each attribute is identical to the name of the corresponding field, in lower case;

writing a JAVA public method 1740 to get the value of each attribute;

writing a JAVA public method 1745 to set the value of each attribute;

writing a JAVA public method named "equals" 1750 which returns a boolean value. (The parameter to this method is an object of the Object class. This class shall return 'true' if the parameter is an instance of the Primary Key class and if the parameter's attributes have values equal to the values of the attributes of this object.); and writing a JAVA public method named "hashcode" 1755 which returns an integer value and this method forms a String of the attribute values and returns a hash code of that String. These JAVA constructs are stored in one or more memories (depending, as above, on the number of files, tables, fields, etc.) which may be arbitrarily constituted.

As shown in FIGS. 5A and 5B, the preferred embodiment for generating the Persistent JAVA file is performed by executing the following functions:

generating 1800, for each selected table, a file with filename equal to the table name followed by the word "Persistent" and file extension "java";

writing header comments 1810 indicating that this JAVA class encapsulates one row of the selected table and that this client side class can be passed to the server for execution;

writing a JAVA package definition 1815 consistent with the user specified directory path;

writing a JAVA statement to import the following classes
javax.naming.InitialContext 1820;
javax.naming.NamingException 1825;
javax.rmi.PortableRemoteObject 1830;
java.sql.Connection 1835,
java io.Serializable 1840; and
all classes of the utility package corn Imco.util 1845;

writing a JAVA class definition 1850 with the class name equal to the file name;

writing a JAVA statement 1855 indicating that the class extends the corresponding Data class;

writing a JAVA statement 1860 indicating that the class implements the Serializable interface and the PersistentObject interface;

writing a JAVA public method 1865 to construct an object of this class without any parameters;

writing a JAVA public method 1870 to construct an object of this class with the attributes of the Data class as parameters; and writing a JAVA public method 1875 to construct an object of this class with an object of the Data class as parameters.

As further shown in FIG. 8B, the next function is:

writing a JAVA public method 1880 named "create" which returns a boolean expression. (The body of this method provides a JAVA try-and-catch block to invoke the "create" method of the Home interface with the attributes of this class as parameters. If an exception occurs, the result is false; otherwise the result is true.);

writing a JAVA public method 1885 named "read" which returns a boolean expression. The body of this method provides a JAVA try-and-catch block to invoke the "findByPrimaryKey" method of the Home interface with the Primary Key class as parameter. (If an exception occurs, the result is false, otherwise, the result is true and the attributes of this class are set to the values in the Remote interface returned by the "findByPrimaryKey" method.);

writing a JAVA public method 1890 named "update" which returns a boolean expression. (The body of this method provides a JAVA try-and-catch block to invoke the "findByPrimaryKey" method of the Home interface, with the primary key class as parameter. If an exception occurs, the result is false; otherwise, the result is true and the attributes of the Remote interface are set to the values of the attributes in this class.);

writing a JAVA public method 1895 named "delete" which returns a boolean expression. (The body of this method provides a JAVA try-and-catch block to invoke the "remove" method of the Home interface with the Primary Key class as parameter. If an exception occurs, the result is false, otherwise the result is true.); and writing a JAVA protected method 1898 named "getHome" to return an object of the Home class. (The body of this method provides a JAVA try-and-catch block to use an object of type InitialContext to look up the JNDI (Java Naming and Directory Interface) name. The JNDI name is preferably equal to the name of the selected table. These resulting JAVA constructs are stored, as desired, in memory 1805.

Figure 9B:
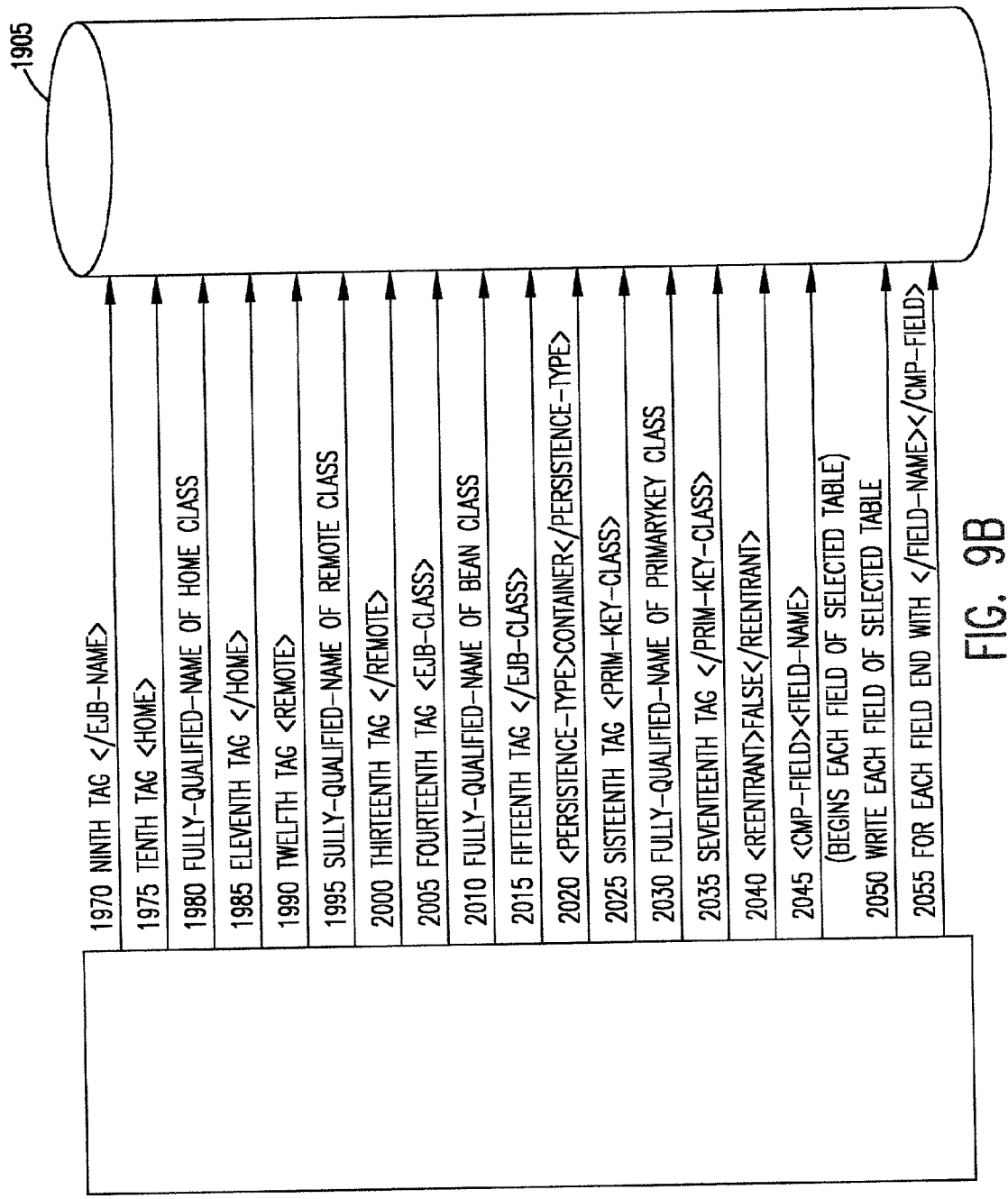
Figure 9C:
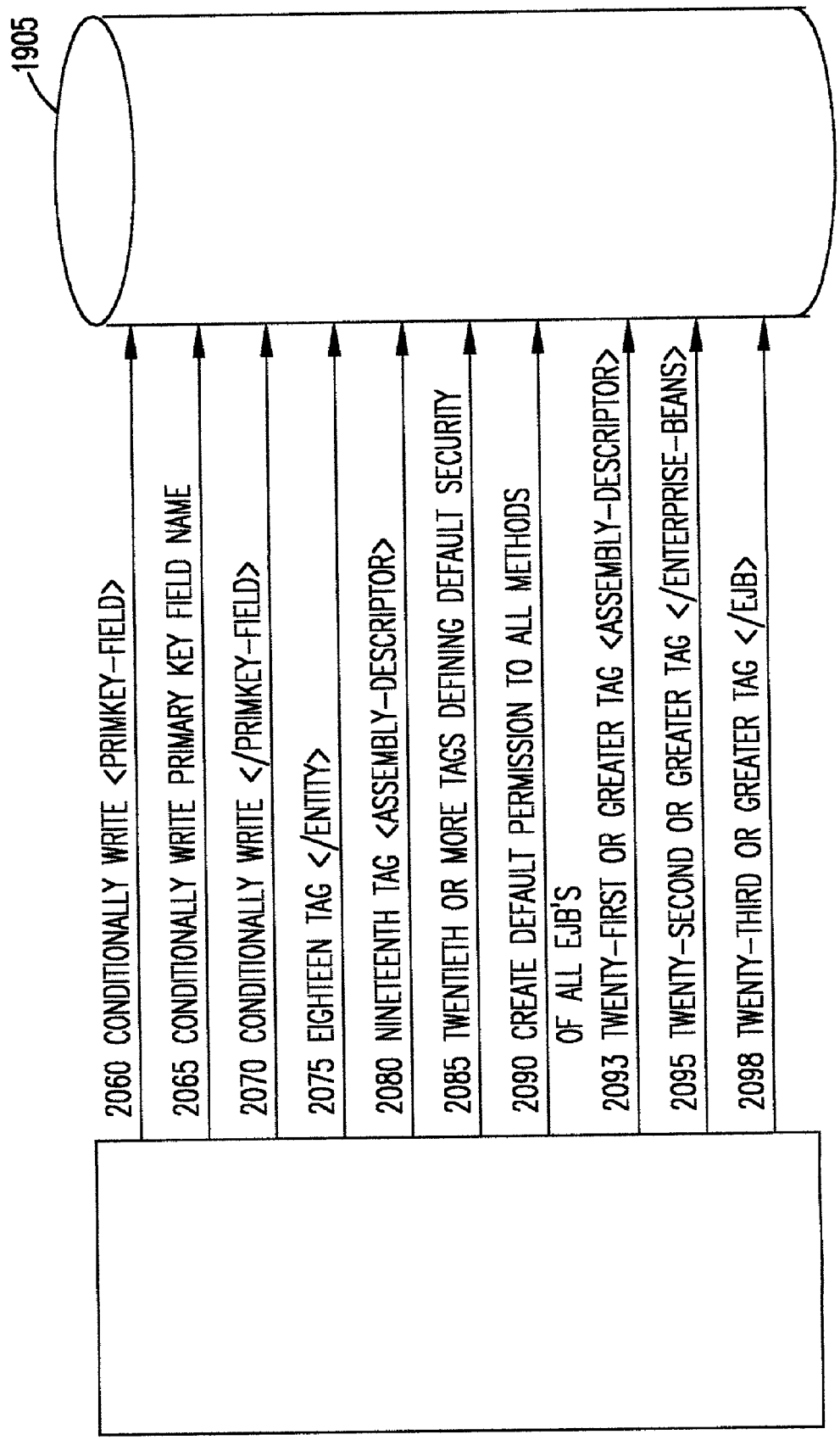

As shown in FIGS. 9A–9C, the preferred embodiment for generating the EJB Deployment Descriptor XML file is performed by executing the following functions:

generating a file 1900 with filename "ejb-jar.xml" and located in a folder named META-INF one directory deep within the user-specified target path;

writing 1910 an XML header statement for documents of type "ejb-jar";

writing 1915 the first tag <ejb> to begin the document;

writing 1920 the second tag <description> to begin the description;

writing 1925 a description of the jar file which includes the package name and the jar file name specified by the user;

writing 1930 the third tag <description> to end the description, writing 1935 the fourth tag <enterprise-beans> to begin the list of EJB'S;

writing 1940 a fifth tag <entity> to begin a definition of the corresponding entity EJB;

writing 1945 a sixth tag <description> to begin the description of the EJB;

writing 1950 a description of the EJB including the name of the corresponding selected table;

writing 1955 a seventh tag </description> to end the description of the EJB;

writing 1960 an eighth tag <ejb-name> to begin the name of the EJB;

writing 1965 the name of the corresponding selected table;

writing 1970, FIG. 8B) a ninth tag </ejb-name> to end the name of the EJB, writing 1975 a tenth tag <home> to begin the home of the EJB;

writing 1980 the ally qualified name of the corresponding Home class;

writing 1985 an eleventh tag </home> to end the home of the EJB;

writing 1990 a twelfth tag <remote> to begin the remote interface of the EJB;

writing 1995 the fully qualified name of the corresponding Remote class;

writing 2000 a thirteenth tag </remote> to end the remote of the EJB;

writing 2005 a fourteenth tag <ejb-class> to begin the bean class of the EJB;

writing 2010 the fully qualified name of the corresponding Bean class;

writing 2015 a fifteenth tag </ejb-class> to end the bean class of the EJB;

specifying container-maintained persistence 2020 as follows: <persistence-type>Container</persistence-type>;

writing 2025 a sixteenth tag <prim-key-class> to begin the primary key class of the EJB;

writing 2030 the fully qualified name of the corresponding PrimaryKey class;

writing 2035 a seventeenth tag </prim-key-class> to end the primary key class of the EJB;

specifying the EJB as not re-entrant. <reentrant>False</reentrant> 2040, beginning each field of the selected table with <cmp-field><field-name>;

writing 2050 each field of the selected table; ending 2055 each field of the selected table with </field name></cmp-field> if 2060 the selected table has only one primary key field, conditionally writing 2065 the primary key field as <primkey-field> followed by the field name followed by </primkey-field> 2070;

writing 2075 an eighteenth tag </entity> to end a description of the corresponding entity EJB for each selected table;

writing 2080 a nineteenth tag <assembly-descriptor> to begin the assembly descriptor;

writing 2085 additional tags defining a default security role <security-role>:
<description>Default role</description>
<role-name>everyone</role-name>
</security-role>;

providing default permission 2090 to all methods of all EJB's:
<method-permission>
<role-name>everyone</role-name>
<method>
<ejb-name>table name goes here</ejb-name>
<method-name>*</method-name>
</method> . . .
</method-permission>;

specifying container managed transactions for all methods of each EJB

```
<container-transaction>
<description>Methods of this bean require a transaction
</description>
    <method>
        <ejb-name>table name goes here</ejb-name>
        <method-name>*</method-name>
    </method>
    <trans-attribute>Required</trans-attribute>
</container-transaction>;
``` writing 2093 additional tags <assembly> to end assembly descriptor>;

writing 2095 the tag </enterprise-beans> to end the list of EJB's; and writing 2093 additional tags </ejb> to end the document. These further JAVA constructs are stored in storage 1905, as noted above in regard to previous steps of FIG. 1AA.

Figure 10:
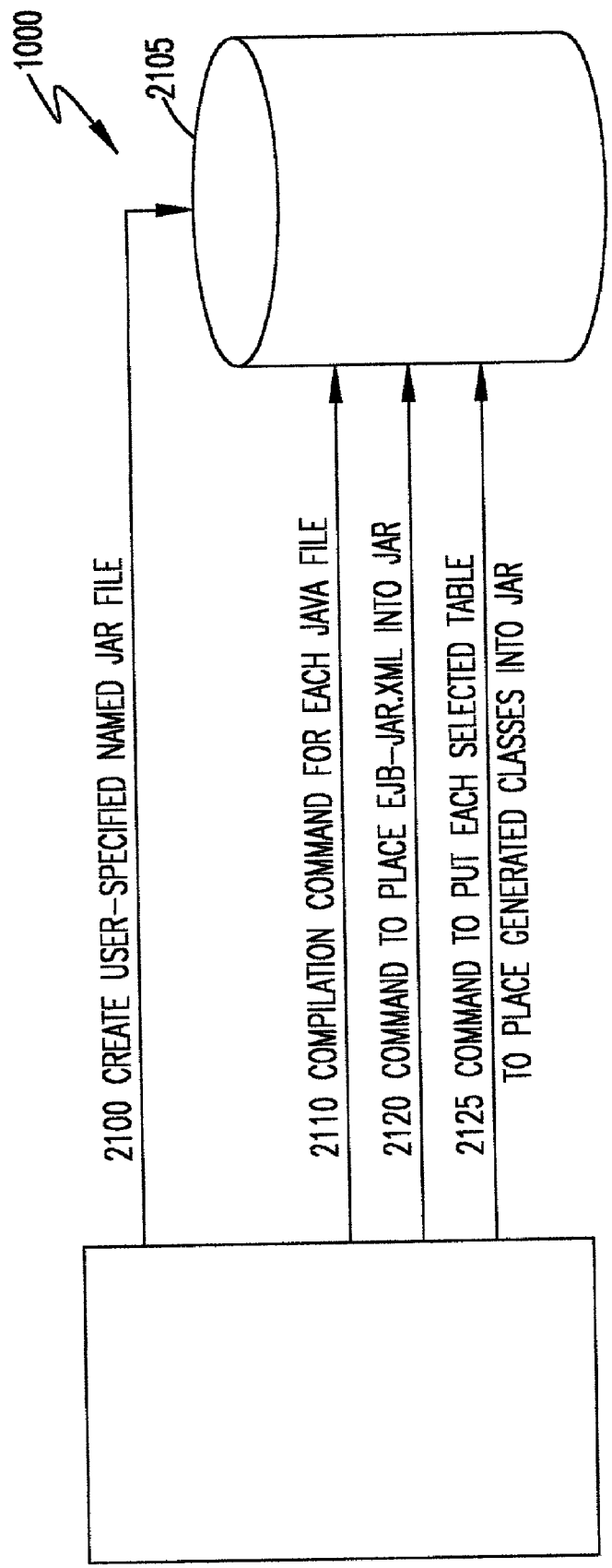
FIG. 10 is a data flow diagram illustrating generation of an EJB batch command file in accordance with the invention.
Figure 11:
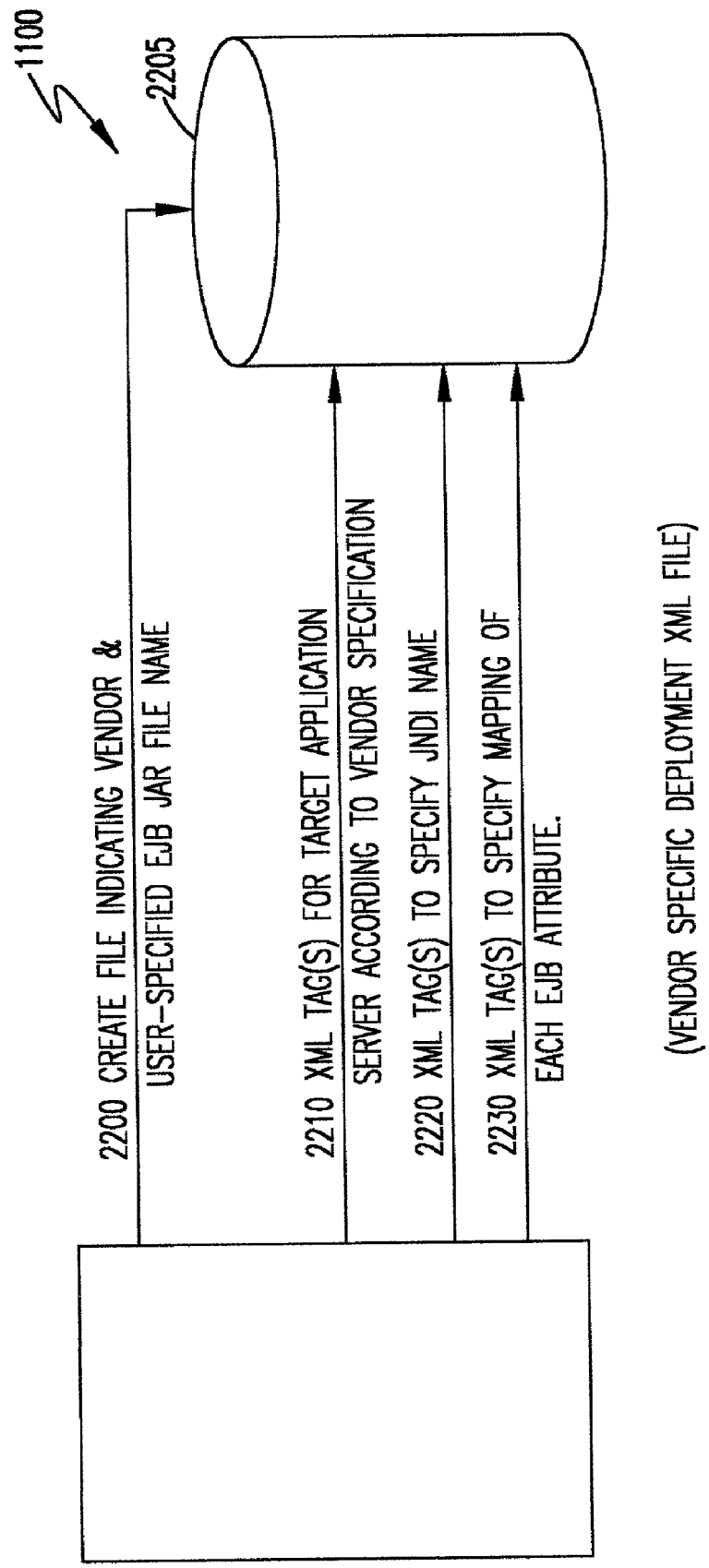
FIG. 11 is a data flow diagram illustrating generation of a vendor specific deployment XML file.

The preferred embodiment for generating the EJB Jar batch command file is accomplished by execution of the following functions, as shown in FIG. 10:

generating a file 2100 with filename set the user-specified name of the Jar file (The file extension on MS Windows-based systems is ".bat".);

writing a command 2110 to compile each generated Java file;

writing a command 2120 to put the ejb-jar.xml file into a Jar file (If the name of the jar is test and the target location of the jar file is L:\staff\maigen\jars\ and the location specified by the user for the output of the BeanGrinder is com\lmco\infolink\ejb\entity\test\, then the command will be jar cvM0f1:\staff\maigen\jars\test.jar-c com\lmco\infolink\ejb\entity\test\META-INF\ejb-jar.xml); and for each selected table, writing a command 2125 to put all of the generated JAVA classes into the Jar file. For the Operation_type table, the command is.

jar uvM0f1:\staff\maigen\jars\test.jar
com\lmco\infolink\ejb\entity\test\Operation_typeData.class
com\lmco\infolink\ejb\entity\test\Operation_typeRemote.class
com\lmco\infolink\ejb\entity\test\Operation_typeBean.class
com\lmco\infolink\ejb\entity\test\Operation_typeHome.class The preferred embodiment of the Vendor-Specific Deployment XML file is performed by executing of the following functions, as shown in FIG. 11:

generating 2200 a file with filename indicating both the vendor and the user-specified name of the EJB Jar file;

generating 2210 XML tags according to vendor specifications for the target Application Server and the details will vary with the Vendor;

generating 2220 XML tags to specify the JNDI name for the EJB corresponding to each selected table and the JNDI name is the same as the selected table name; and generating 2230 XML tags to specify the mapping of each EJB attribute to a field in the selected database table and storing the JAVA constructs as before as indicated at 2205

Figure 12:
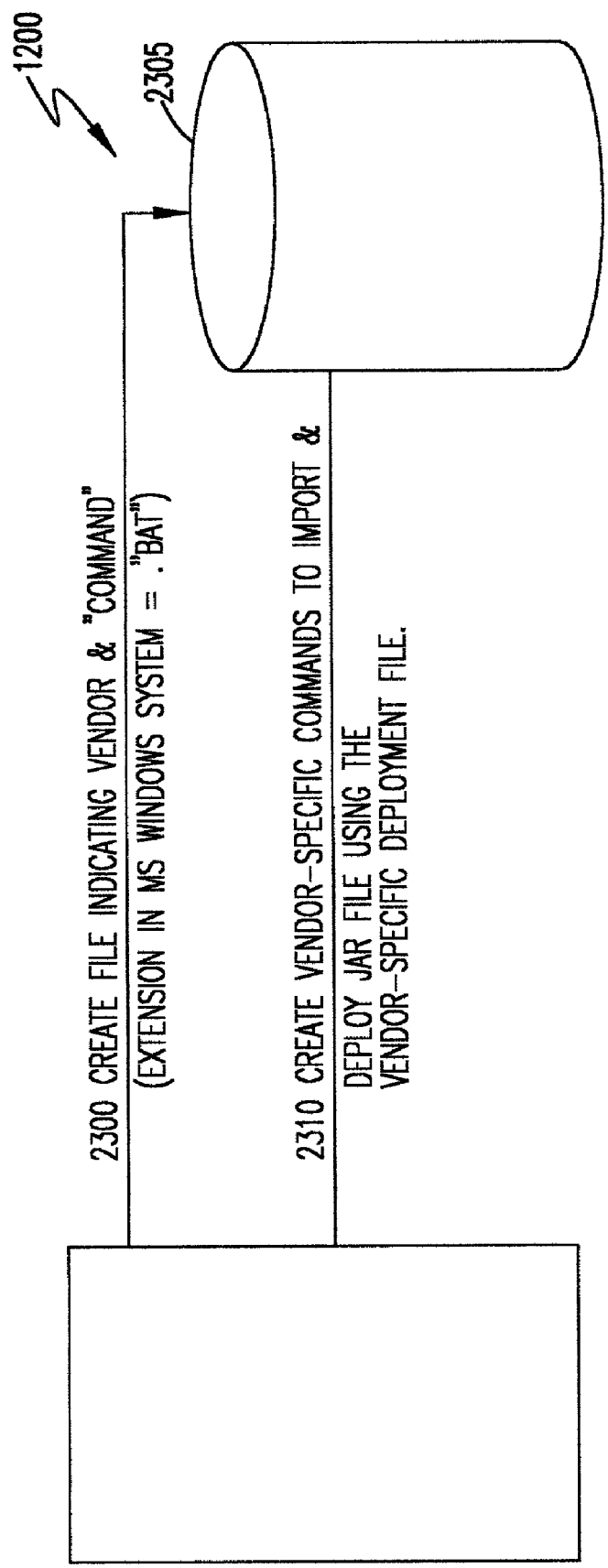
FIG. 12 is a data flow diagram illustrating generation of a vendor specific build file.

The preferred embodiment of the Vendor-Specific Build batch command file is performed by executing the following functions, as shown in FIG. 12:

generating 2300 a file with filename indicating both the vendor and the word "command" (the file extension on MS Windows-based systems is "bat");

generating 2310 vendor-specific commands to import and deploy the Jar file according to the Vendor-Specific Deployment file In view of the foregoing, it is seen that the invention provides a computer implemented method for conversion of database applications, particularly from SQL to JAVA, to database models accessible through languages compatible with network and internet communications as well as a user interface for controlling the process. A particular advantage of the invention is that the data processing for database application conversion can be written and executed in the target language.

While the invention has been described in terms of its preferred embodiments, those skilled in the art will recognize that the invention can be practiced with modification within the spirit and scope of the appended claims.

The invention claimed is:

1. An automated method for converting tables of data in a source database to components of a target application, the method comprising the steps:

obtaining by a computer identification of a) specified tables in said source database containing data usable in said target application, b) a target location for said target application and c) an application server being used for development of said target application at said target location reading by a computer definitions of said specified tables from said source database; and generating by a computer from said database definitions a plurality of source code files for each specified table, said source code files being generated directly in a language of said target application, each said specified table being referenced consistently across said plurality of source code files, said plurality of source code files including object classes and deployment descriptors, said specified tables being made accessible to a remote client by said target application, said target application being developed using said plurality of source code files, wherein said method is applied to obtain identification of specified tables, read definitions of the tables from the database, and generate from the database the source code files in the language of said target application in response to both updates in said database and updates in said target application.

2. The method of claim 1 further comprising the steps of:
providing a user interface to permit interaction with the computer application program;
including in said obtaining step identification of d) an Enterprise JAVA Bean Java Archive (EJB Jar) file;
generating said plurality of source code files in said identified target location, said identified target location being a user-specified directory path, said application server supporting development of Enterprise JAVA Beans (EJBs) and supporting a Java Naming and Directory Interface (JNDI) to assist with said consistent table references, and said plurality of source code files comprising
a Data JAVA file for each specified table, a Home Interface JAVA file for each specified table, a Remote Interface JAVA file for each specified table, a Bean JAVA file for each specified table, a Primary Key JAVA file for each specified table, a Persistent JAVA file for each specified table, an Enterprise JAVA Bean Deployment Descriptor XML file, an Enterprise JAVA Bean Jar batch command file, a Vendor-Specific Deployment XML file, and a Vendor-Specific Build batch command file.

3. The method of claim 2, wherein providing a user interface further comprises the steps of:
querying the database to get names of all tables related to the database, from which each of said specified tables are selected for encapsulation with an EJB; and
querying the database to acquire information about fields within each of said specified tables.

4. The method of claim 2, wherein generating the Data JAVA file further comprises the steps of:
generating a file with its filename equal to a table name followed by the word "Data" and file extension "java";
writing header comments indicating that a JAVA class encapsulates one row of the specified table;
writing a JAVA package definition consistent with the user-specified directory path;
writing a first JAVA statement to import ajava.io.Serializable class;
writing a JAVA class definition with a class name equal to its filename;
writing a second JAVA statement indicating that the class implements the Serializable interface;
writing a corresponding attribute definition for each one of a plurality of fields in the specified table;
ensuring that a JAVA data type of each one of a plurality of attributes is compatible with a database data type of its corresponding field;
ensuring that a name of each one of the plurality of attributes is identical to the name of its corresponding field;
writing a first JAVA public method to get a value of each one of the plurality of attributes;
writing a second JAVA public method to set the value of each one of the plurality of attributes; and writing a third JAVA public method named "toString" to return a string representing a Data class.

5. The method of claim 2, wherein generating the Home Interface JAVA file further comprises the steps of:
generating a file with filename equal to a table name followed by the word "Home" and file extension "java";
writing header comments indicating that a JAVA class is the Home Interface for the Bean encapsulating the specified table;
writing a JAVA package definition consistent with the user-specified directory path;
writing a first JAVA statement to import the following classes: javax.ejb.EJBHome; javax.ejb.FinderException; javax.ejb.CreateException; java.rmi.RemoteException; java.util.Collection;
writing a JAVA interface definition with an interface name equal to the filename;
writing a second JAVA statement indicating that the class extends the EJBHome interface;
writing a first JAVA method signature named "create" which takes as parameters the attributes of Data class and returns an object of Remote class;
writing a second JAVA method signature named "create" which takes as a parameter an object of Data class and returns an object of Remote class; and
writing a third JAVA method signature named "findByPrimaryKey" which takes as a parameter an object of PrimaryKey class and returns an object of Remote class wherein writing the JAVA method signature named "findByPrimaryKey" has one primary key and the computer application program makes the parameter its corresponding attribute of Data class.

6. The method of claim 2, wherein generating the Remote Interface JAVA file further comprises the steps of:
generating a file with its filename equal to the table name followed by the word "Remote" and file extension "java";
writing header comments indicating that this JAVA class is the Remote interface for the Bean encapsulating the specified table;
writing a JAVA package definition consistent with the user-specified directory path;
writing a first JAVA statement to import the following classes: javax.ejb.EJBobject; java.rmi.RemoteException;
writing a JAVA interface definition with its interface name equal to the filename;
writing a second JAVA statement indicating that the class extends the EJBObject interface;
writing a first JAVA public method signature to get a value of each attribute and wherein the signature indicates that the method may throw a Remote Exception; and
writing a second JAVA public method to set the value of each attribute signature and wherein the signature shall indicate that the method may throw a Remote Exception.

7. The method of claim 2, wherein generating the Bean JAVA file further comprises the steps of:
generating a file with its filename equal to its table name followed by the word "Bean" and file extension "java";
writing header comments indicating that the JAVA class is an EJB which encapsulates one row of the specified table;
writing a JAVA package definition consistent with the user-specified directory path;

writing a first JAVA statement to import the following classes: java.rmi.RemoteException; all classes in the javax.ejb package; all classes in the java.util package;

writing a JAVA class definition with its class name equal to the filename;

writing a second JAVA statement indicating that the class implements the EntityBean interface;

writing an attribute definition for one attribute named "theContext" of type "EntityContext";

writing, for each field in the specified table, its corresponding attribute definition;

ensuring that the JAVA data type of each attribute is compatible with the database data type of its corresponding field;

ensuring that each attribute is identical to the lower-case name of its corresponding field;

writing a first JAVA public method to get the value of each attribute;

writing a second JAVA public method to set the value of each attribute;

writing a third JAVA public method named "setAll" which has an object of Data class as parameter and can throw a Remote Exception and wherein each attribute of Bean class is set to the value of its corresponding Data attribute;

writing a fourth JAVA public method named "getAll" which returns an object of Data class and can throw a Remote Exception;

writing a fifth JAVA public method named "ejbCreate" with attributes of Data class as parameters and a signature of this method says it returns an object of type "String" but the body of the method must return "null" and this method can throw a Create Exception and a Remote Exception;

writing a sixth JAVA public method named "ejbPostCreate" with attributes of Data class as parameters and the signature of this method says it returns an object of type "String" but the body of the method must return "null" and this method can throw a Create Exception and a Remote Exception;

writing a seventh JAVA public method named "ejbPostCreate" with an object of Data class as the parameter and the signature of this method says it returns an object of type "String" but the body of the method must return "null" and this method can throw a Create Exception and a Remote Exception;

writing an eighth JAVA public method named "ejbLoad" which can throw an EJB Exception or a Remote Exception and the body of this method may be empty;

writing a ninth JAVA public method named "ejbStore" which can throw an EJB exception or a Remote exception and the body of this method may be empty;

writing a tenth JAVA public method named "ejbActivate" which can throw an EJB Exception or a Remote Exception and the body of this method can be empty;

writing an eleventh JAVA public method named "ejbPassivate" which can throw an EJB Exception or a Remote Exception and the body of this method can be empty;

writing a twelfth JAVA public method named "ejbRemove" which can throw an EJB Exception or a Remote Exception and the body of this method can be empty;

writing a thirteenth JAVA public method named "setEntityContext" which can throw an EJB exception or a Remote Exception and the parameter for this method is an object of type EntityContext and is used to set theContext;

writing a fourteenth JAVA public method named "unsetEntityContext" which can throw an EJB Exception or a Remote Exception and this method sets theContext to "null"; and writing a fifteenth JAVA public method named "toString" to return a string representing the Bean class.

8. The method of claim 2, wherein generating the Primary Key JAVA file further comprises the steps of:

generating a file with at least two primary key fields such that its filename is made equal to its table name followed by the word "PrimaryKey" and file extension "java";

writing header comments indicating that this JAVA class encapsulates the Primary Key of the specified table;

writing a JAVA package definition consistent with the user-specified directory path;

writing a first JAVA statement to import the java.io.Serializable class;

writing a JAVA class definition with the class name equal to its filename;

writing a second JAVA statement indicating that its class implements the Serializable interface;

writing a corresponding attribute definition for each primary key field;

ensuring that the JAVA data type of each attribute is compatible with the database data type of its corresponding field;

ensuring that each attribute is identical to the lower case name of its corresponding field;

writing a first JAVA public method to get the value of each attribute;

writing a second JAVA public method to set the value of each attribute;

writing a third JAVA public method named "equals" which returns a boolean value and the parameter to this method is an object of the Object class and returns "true" if the parameter is an instance of the Primary Key class and if the parameter's attributes have values equal to the values of the attributes of this object; and writing a fourth JAVA public method named "hashcode" which returns an integer value and this method forms a String of the attribute values and returns a hash code of that String.

9. The method of claim 2, wherein generating the Persistent JAVA file further comprises the steps of:

generating a file with filename equal to the table name followed by the word "Persistent" and file extension "java";

writing header comments indicating that this JAVA class encapsulates one row of the specified table and this client side class can be passed to the server for execution;

writing a JAVA package definition consistent with the user specified directory path;

writing a first JAVA statement to import the following classes javax.naming.InitialContext; javax.naming.NamingException; javax.rmi.PortableRemoteObject; java.sql.Connection; java.io.Serializable; all classes of the utility package com.lmco.util;

writing a JAVA class definition with the class name equal to the filename;

writing a second JAVA statement indicating that the class extends its corresponding Data class;

writing a third JAVA statement indicating that the class implements the Serializable interface and the PersistentObject interface;

writing a first JAVA public method to construct an object of this class without any parameters;

writing a second JAVA public method to construct an object of this class with the attributes of the Data class as parameters;

writing a third JAVA public method to construct an object of this class with an object of the Data class as parameters;

writing a fourth JAVA public method named "createt" which returns a boolean and the body of this method provides a JAVA try-and-catch block to invoke the "create" method of the Home interface with the attributes of this class as parameters and if an exception occurs, the result is false or otherwise the result is true;

writing a fifth JAVA public method named "read" which returns a boolean and the body of this method provides a JAVA try-and-catch block to invoke the "findByPrimaryKey" method of the Home interface with the Primary Key class as parameter and if an exception occurs, the result is false or otherwise, the result is true and the attributes of this class are set to the values in the Remote interface returned by the "findByPrimaryKey" method;

writing a sixth JAVA public method named "update" which returns a boolean and the body of this method provides a JAVA try-and-catch block to invoke the "findByPrimaryKey" method of the Home interface, with the primary key class as parameter and if an exception occurs, the result is false or otherwise, the result is true and the attributes of the Remote interface are set to the values of the attributes in this class;

writing an seventh JAVA public method named "delete" which returns a boolean and the body of this method provides a JAVA try-and-catch block to invoke the "remove" method of the Home interface with the Primary Key class as parameter and if an exception occurs, the result is false or otherwise the result is true; and writing a JAVA protected method named "getHome" to return an object of the Home class and the body of this method providing a JAVA try-and-catch block to use an object of type InitialContext to look up in the JNDI a name which JNDI name is equal to the name of the specified table.

10. The method of claim 2, wherein generating the EJB Deployment Descriptor XML file further comprises the steps of:

generating a file with filename "ejb-jar.xml" and located in a folder named META-INF one directory deep within the user-specified target directory path;

writing an XML header statement for documents of type "ejb-jar";

writing a first tag <ejb> to begin the document;

writing a second tag <description> to begin a description;

writing the description of a jar file which includes the package name and the identified EJB jar filename;

writing a third tag </description> to end the description;

writing a fourth tag <enterprise-beans> to begin a list of EJB's;

writing a fifth tag <entity> to begin a definition of its corresponding entity EJB;

writing a sixth tag <description> to begin the description of the EJB;

writing a description of the EJB including the name of its corresponding specified table;

writing a seventh tag </description> to end the description;

writing an eighth tag <ejb-name> to begin the name of the EJB;

writing the name of its corresponding specified table;

writing a ninth tag </ejb-name> to end the name of the EJB;

writing a tenth tag <home> to begin a home of the EJB;

writing a fully-qualified-name of its corresponding Home class;

writing an eleventh tag </home> to end the home of the EJB;

writing a twelfth tag <remote> to begin a remote interface of the EJB;

writing a fully-qualified-name of its corresponding Remote class;

writing a thirteenth tag</remote> to end the remote of the EJB;

writing a fourteenth tag <ejb-class> to begin a bean class of the EJB;

writing the fully-qualified-name of its corresponding Bean class;

writing a fifteenth tag </ejb-class> to end the bean class of the EJB;

specifying container-maintained persistence with the statement <persistence-type>Container</persistence-type>;

writing a sixteenth tag <prim-key-class> to begin the primary key class of the EJB;

writing the fully-qualified-name of its corresponding PrimaryKey class;

writing a seventeenth tag </prim-key-class> to end the primary key class of the EJB;

specifying the EJB as not re-entrant by writing <reentrant>False</reentrant>;

beginning each field of the specified table with <cmp-field><field-name>;

writing each field of the specified table;

ending each field of the specified table with </field name></cmp-field>;

if the specified table has only one primary key field, writing the primary key field as <primkey-field> followed by the field name followed by </primkey-field>;

writing an eighteenth tag </entity> to end a description of its corresponding entity EJB for each specified table;

writing a nineteenth tag <assembly-descriptor> to begin the assembly descriptor;

writing a twentieth or more tags defining a default security role;

providing default permission to all methods of all EJB's;

specifying container-managed transactions for all methods of each EJB;

writing a twenty-first or greater tag <assembly-descriptor> to end assembly;

writing a twenty-second or greater tag </enterprise-beans> to end the list of EJB's; and writing a twenty-third or greater tag </ejb> to end the document.

11. The method of claim 2, wherein generating the EJB Jar batch command file further comprises the steps of:

generating a file with filename set to the identified name of the Jar file where the file extension on MS Windows-based systems is "bat";

writing a command to compile each generated Java file;

writing a command to put the ejb-jar.xml file into one Jar file; and for each specified table, writing a command to put all of generated JAVA classes into the Jar file.

12. The method of claim 2, wherein generating the Vendor-Specific Deployment XML file further comprises the steps of:
  generating a file with filename indicating both the vendor and the identified name of the EJB Jar file;
  generating one or more XML tags according to vendor specifications for a target Application Server and for which the details will vary with the Vendor;
  generating one or more XML tags to specify a JNDI name for the EJB corresponding to each specified table and the JNDI name is the same as its specified table name; and
  generating one or more XML tags to specify mapping of each EJB attribute to its field in the specified database table.

13. The method of claim 2, wherein generating the Vendor-Specific Build batch command file further comprises the steps of:
  generating a file with its filename indicating both a vendor and the word "command" and wherein the file extension on MS Windows-based systems is "bat";
  generating vendor-specific commands to import and deploy a Jar file according to the Vendor-Specific Deployment file.

* * * * *